(12) United States Patent
Arashin et al.

(10) Patent No.: US 10,967,890 B2
(45) Date of Patent: Apr. 6, 2021

(54) TRAIN COMMUNICATION SYSTEM

(71) Applicant: Panasonic Intellectual Property Management Co., Ltd., Osaka (JP)

(72) Inventors: Nobuhiko Arashin, Osaka (JP); Takuji Maeda, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 264 days.

(21) Appl. No.: 16/139,724

(22) Filed: Sep. 24, 2018

(65) Prior Publication Data

US 2019/0023293 A1 Jan. 24, 2019

Related U.S. Application Data

(63) Continuation of application No. PCT/JP2017/007655, filed on Feb. 28, 2017.

(30) Foreign Application Priority Data

Apr. 1, 2016 (JP) .............................. JP2016-074515

(51) Int. Cl.
*B61L 15/00* (2006.01)
*H04W 4/46* (2018.01)
(Continued)

(52) U.S. Cl.
CPC ........... *B61L 15/0027* (2013.01); *B60L 15/42* (2013.01); *B61L 23/34* (2013.01); *H01Q 1/325* (2013.01);
(Continued)

(58) Field of Classification Search
CPC ... B61L 15/00; B61L 15/0018; B61L 15/0027
See application file for complete search history.

(56) References Cited

U.S. PATENT DOCUMENTS 5,720,455 A * 2/1998 Kull .................. B60L 15/32
246/187 C
5,867,801 A * 2/1999 Denny .................. B61L 3/125
246/169 R
(Continued)

FOREIGN PATENT DOCUMENTS

JP 5-76941 10/1993
JP 2012-4863 1/2012
(Continued)

OTHER PUBLICATIONS

International Search Report dated May 30, 2017 in corresponding International Application No. PCT/JP2017/007655.

*Primary Examiner* — Robert J McCarry, Jr.
(74) *Attorney, Agent, or Firm* — Wenderoth, Lind & Ponack, L.L.P.

(57) ABSTRACT

A first antenna group includes one first antenna disposed at one end of a leading car, and another first antenna disposed at one end of a following car. A second antenna group includes one second antenna disposed at the one end of the leading car, the position where the one second antenna is disposed being different from the position where the one first antenna is disposed in a direction orthogonal to a travel direction of the leading car, and another second antenna disposed at the one end of the following car. A measurement unit measures radio wave strength between a pair of first antennas during communication via the first antenna group. A controller is enabled to make a switch from the first antenna group to the second antenna group when the radio wave strength is less than a predetermined value.

12 Claims, 9 Drawing Sheets

(51) Int. Cl.
  *H04W 4/42*    (2018.01)
  *B60L 15/42*   (2006.01)
  *H04W 16/28*   (2009.01)
  *H01Q 1/32*    (2006.01)
  *H01Q 21/28*   (2006.01)
  *H04B 17/318*  (2015.01)
  *B61L 23/34*   (2006.01)
  *H04B 7/06*    (2006.01)

(52) U.S. Cl.
  CPC .......... *H01Q 21/28* (2013.01); *H04B 7/0608* (2013.01); *H04B 17/318* (2015.01); *H04W 4/42* (2018.02); *H04W 4/46* (2018.02); *H04W 16/28* (2013.01); *Y02T 90/16* (2013.01)

(56) References Cited

U.S. PATENT DOCUMENTS

| | | | |
|---|---|---|---|
| 6,782,044 B1 * | 8/2004 | Wright | B61L 15/0027 375/224 |
| 8,185,264 B2 * | 5/2012 | Carroll | B61L 15/0027 701/19 |
| 2002/0030590 A1 * | 3/2002 | Dieckmann | B60D 1/62 340/431 |
| 2016/0242098 A1 | 8/2016 | Tsukarnoto | |

FOREIGN PATENT DOCUMENTS

| | | |
|---|---|---|
| JP | 2014-11700 | 1/2014 |
| WO | 2015/059980 | 4/2015 |

* cited by examiner

FIG. 6

| SPEED OF HEAD CAR 10a [km/h] | SWITCH TIMING | | |
|---|---|---|---|
| | BETWEEN FOLLOWING CAR 10d AND FOLLOWING CAR 10c | BETWEEN FOLLOWING CAR 10c AND FOLLOWING CAR 10d | BETWEEN FOLLOWING CAR 10d AND FOLLOWING CAR 10e |
| 50 | IN 1.5 SECONDS | IN 3 SECONDS | IN 4.5 SECONDS |
| 60 | IN 1.25 SECONDS | IN 2.5 SECONDS | IN 3.75 SECONDS |
| 70 | IN 1 SECOND | IN 2 SECONDS | IN 3 SECONDS |
| ⋮ | ⋮ | ⋮ | ⋮ |
| 140 | IN 0.5 SECONDS | IN 1 SECOND | IN 1.5 SECONDS |
| ⋮ | ⋮ | ⋮ | ⋮ |

FIG. 7

| SPEED OF HEAD CAR 10a [km/h] | DELAY COEFFICIENT |
|---|---|
| 50 | 1.5 |
| 60 | 1.25 |
| 70 | 1 |
| ⋮ | ⋮ |
| 140 | 0.5 |
| ⋮ | ⋮ |

TRAIN COMMUNICATION SYSTEM

TECHNICAL FIELD

The present disclosure relates to a train communication system.

BACKGROUND ART

There is a method for establishing a communication network environment between cars of a train with wired communication based on a standard such as Gigabit Ethernet (registered trademark). However, with this method, it is difficult to retrofit existing cars with a communication network environment. As a measure against the difficulty, an introduction of radio communication between cars is conceivable, but the radio communication has a problem such as interference or unintentional connection. Therefore, proposed is a train communication system that establishes radio communication between cars based on low power radio, the radio communication being tolerant of interference and the like. Further, in such a train communication system, a plurality of radio paths are provided between cars to secure redundancy. PTL 1 discloses a technique regarding such a train communication system.

CITATION LIST

Patent Literature

PTL 1: Unexamined Japanese Patent Publication No. 2012-4863

SUMMARY OF THE INVENTION

A train communication system of the present disclosure uses low power radio to perform communication between cars. The train communication system includes a first antenna group, a second antenna group, a measurement unit, and a controller. The first antenna group includes a pair of first antennas arranged facing each other. One first antenna of the pair of first antennas is disposed at one end of a leading car. The other first antenna of the pair of first antennas is disposed at one end of a first following car coupled with the one end of the leading car. The second antenna group includes a pair of second antennas arranged facing each other. One second antenna of the pair of second antennas is disposed at the one end of the leading car, a position where the one second antenna is disposed being different from a position where the one first antenna of the pair of first antennas in a direction orthogonal to a travel direction of the leading car in top view. The other second antenna of the pair of second antennas is disposed at the one end of the first following car. The measurement unit measures, during communication via the first antenna group, first radio wave strength between the pair of first antennas. The controller is enabled to switch an antenna group to be used for communication from the first antenna group to the second antenna group when the first radio wave strength is less than a first predetermined value.

The train communication system according to the present disclosure prevents a communication condition from deteriorating when, for example, cars travel on a curved railway track.

BRIEF DESCRIPTION OF DRAWINGS

FIG. 6 is a table showing examples of switch timing for pairs of antennas between cars, the switch timing corresponding to a speed of a head car.

FIG. 7 is a table showing examples of a delay coefficient corresponding to the speed of the head car.

DESCRIPTION OF EMBODIMENTS (Background Leading to One Aspect of Present Disclosure)

Between cars of a train, video may be distributed to a monitor installed on each of the cars or data output from a monitoring camera installed on each of the cars may be transmitted and received. When radio is used for such communication between cars, a problem arises such as interruption of communication. Therefore, it is conceivable that a plurality of radio paths are provided between cars for fail-safe behavior. Low power radio that is tolerant of interference and the like is applicable to communication between cars. The low power radio has a low radio wave output and a short communication distance, which allows an antenna to be installed at a coupling section of each car where a distance between cars is small. In this configuration, when the cars travel on a curved railway track, each space between the coupling sections of the cars becomes wider toward an outer side of the curve, and as a result, radio wave strength becomes lower in some places at the coupling sections where the antennas are installed, and the communication condition deteriorates. This problem will be described in detail with reference to FIG. 1A and FIG. 1B.

Figure 1A:
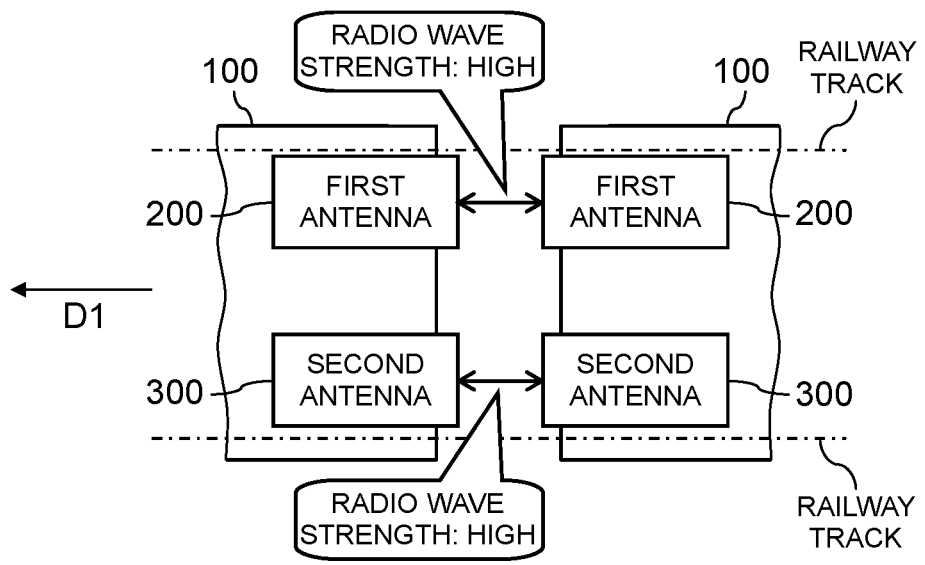
FIG. 1A is a diagram for describing a situation where a communication condition deteriorates when cars travel on a curved railway track.
Figure 1B:
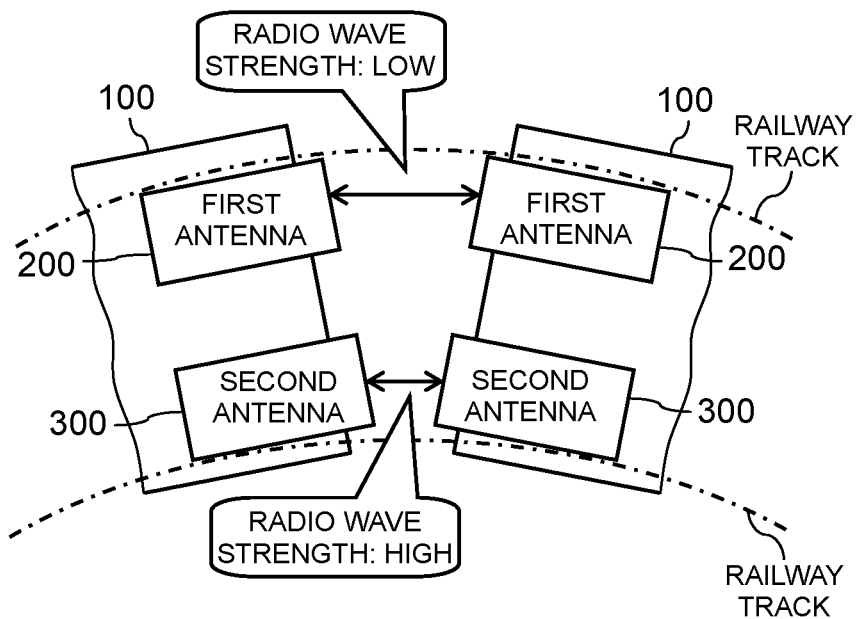
FIG. 1B is a diagram for describing a situation where a communication condition deteriorates when cars travel on a curved railway track.

FIG. 1A and FIG. 1B are diagrams for describing a situation where a communication condition deteriorates when cars 100 travel on a curved railway track. FIG. 1A and FIG. 1B are schematic diagrams of cars 100 in top view. Arrow D1 in FIG. 1A indicates a travel direction of cars 100 in top view. Further, FIG. 1A and FIG. 1B show, as a plurality of radio paths, a radio path between a pair of first antennas 200 and a radio path between a pair of second antennas 300. Each first antenna 200 is provided on one end side of corresponding car 100 (an upper side in FIG. 1A) in a direction orthogonal to travel direction D1 of corresponding car 100. Each second antenna 300 is provided on another end side of corresponding car 100 (a lower side in FIG. 1A) in a direction orthogonal to travel direction D1 of corresponding car 100. Further, FIG. 1A shows cars 100 traveling on a straight railway track, and FIG. 1B shows cars 100 traveling on a curved railway track.

As shown in FIG. 1A, for example, first antennas 200 and second antennas 300 are installed such that both radio wave strength between first antennas 200 and radio wave strength between second antennas 300 are high when cars 100 travel on a straight railway track. Therefore, when cars 100 travel on a straight railway track, the communication condition is less likely to deteriorate. In contrast, as shown in FIG. 1B, when cars 100 travel on a curved railway track, each space between coupling sections of cars 100 becomes wider toward an outer side of the curve. Accordingly, when cars 100 travel on a curved railway track and the one end side of each car 100 lies on the outer side of the curve, radio wave strength between first antennas 200 becomes lower. Likewise, a different curve may cause the other end side of each car 100 to lie on the outer side of the curve, which may cause radio wave strength between second antennas 300 to become lower. Communication between cars 100 is performed over either the radio path between first antennas 200 or the radio path between second antennas 300; thus, the communication condition may deteriorate when cars 100 travel on a curved railway track.

Therefore, a description will be given of a train communication system that prevents a communication condition from deteriorating when cars travel on a curved railway track.

Hereinafter, exemplary embodiments will be described in detail with appropriate reference to the drawings. Note that unnecessarily detailed description may be omitted. For example, a detailed description of a well-known matter and a redundant description on substantially the same configuration may be omitted. This is to avoid the following description being unnecessarily redundant and to help those skilled in the art to easily understand the description.

Note that the inventors of the present disclosure provide the attached drawings and the following description in order to allow those skilled in the art to fully understand the present disclosure, and do not intend to limit the subject matter as described in the appended claims.

First Exemplary Embodiment

A first exemplary embodiment will be described below with reference to FIGS. 2A to 9.

[Configuration]

Figure 2A:
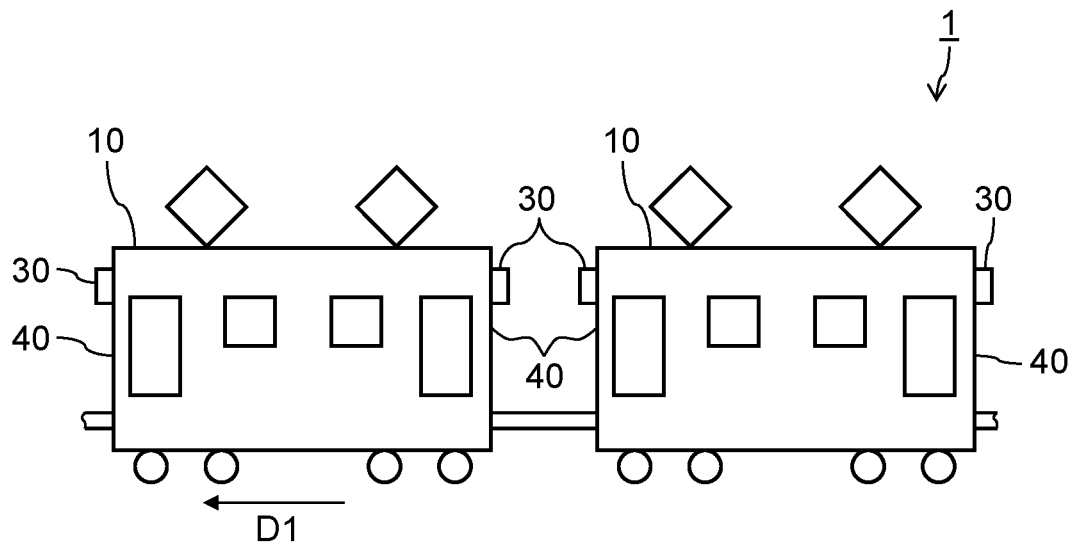
FIG. 2A is a side view of a train communication system according to a first exemplary embodiment, showing an example of an appearance of the train communication system.

FIG. 2A is a side view of train communication system 1 according to the first exemplary embodiment, showing an example of an appearance of train communication system 1.

Figure 2B:
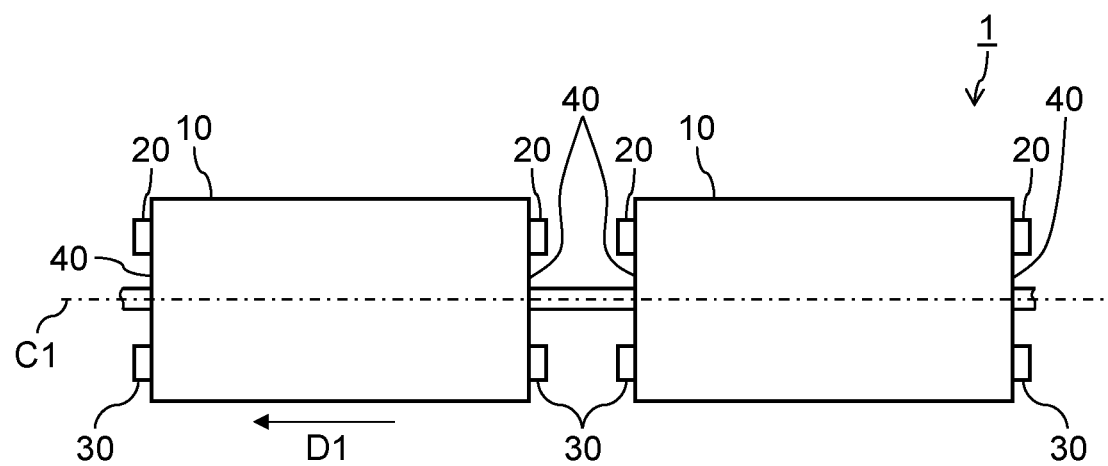
FIG. 2B is a top view of the train communication system according to the first exemplary embodiment, showing an example of the appearance of the train communication system.

FIG. 2B is a top view of train communication system 1 according to the first exemplary embodiment, showing an example of the appearance of train communication system 1.

Train communication system 1 is a system that uses low power radio to perform communication between cars 10. In the first exemplary embodiment, as the low power radio, radio communication that uses radio waves in a millimeter wave band (a frequency band ranging from 30 GHz to 300 GHz) and has a high (narrow) directivity is used. Specifically, for example, radio communication based on IEEE 802.11ad standard for operation in the 60 GHz band (WiGig (registered trademark): Wireless Gigabit) is used. The radio communication based on WiGig (registered trademark) achieves high-speed communication at a theoretical throughput up to about 7 Gbps and large volume data transfer. Further, the radio communication based on WiGig (registered trademark) has a communication distance of several meters or less.

As shown in FIG. 2A, for communication between cars 10, antennas are provided at coupling section 40 of each car 10 (for example, second antennas 30 shown in FIG. 2A). Antennas facing each other are paired with each other. Coupling section 40 is a section where cars 10 are coupled together and that is located at front and rear ends of each car 10. Coupling section 40 is a section where a distance between cars 10 is short. Note that car 10 serving as a head car may be provided with an antenna only at the rear end section, and car 10 serving as a last car may be provided with an antenna only at the front end section.

For example, a configuration using the radio communication based on WiGig (registered trademark) having a communication distance of several meters or less and having a high directivity prevents an antenna provided at coupling section 40 located at the front end of car 10 and an antenna provided at coupling section 40 located at the rear end of this car 10 from establishing communication (unintentional connection) with each other. This configuration further prevents an antenna provided on car 10 and an antenna provided on a rear side of another car 10 that is coupled with car 10 from being unintentionally connected with each other. Specifically, for example, this configuration prevents second antenna 30 provided at a right end of car 10 shown on a left side of FIG. 2A from being unintentionally connected with second antenna 30 provided at a right end of car 10 shown on a right side of FIG. 2A beyond second antenna 30 provided at a left end of car 10 shown on the right side. This configuration using the radio communication based on WiGig (registered trademark) having a high directivity further prevents unintentional connection with, for example, an antenna of a train travelling on an adjacent railway track.

Note that the low power radio is also implemented by, for example, Wi-Fi (registered trademark) whose radio wave strength has been lowered. However, Wi-Fi (registered trademark) has a low (wide) directivity, which makes it difficult to prevent unintentional connection. In addition, Wi-Fi (registered trademark) tends to receive interference from a lot of radio wave interference sources, which deteriorates throughput. Accordingly, WiGig (registered trademark) rather than Wi-Fi (registered trademark) is preferable for communication between cars 10 in train communication system 1.

Further, in the present exemplary embodiment, two radio paths are established between cars 10 for fail-safe behavior. As shown in FIG. 2B, train communication system 1 includes a pair of first antennas 20 and a pair of second antennas 30. The pair of first antennas 20 are at least provided at coupling sections 40 facing each other of two cars 10. The pair of second antennas 30 is at least provided at coupling sections 40 facing each other of two cars 10. The pair of second antennas 30 are disposed at a position different from a position where the pair of first antennas 20 are disposed in a direction orthogonal to travel direction D1 of cars 10 in top view. Then, communication between cars 10 is performed over a radio path via either the pair of first antennas 20 or the pair of second antennas 30. Coupling sections 40 that face each other refer to coupling section 40 located at the rear end of car 10 that is one of cars 10 coupled with each other and is positioned on a front side in a travel direction and coupling section 40 located at the front end of car 10 that is coupled with a rear of car 10 on the front side. That is, coupling sections 40 that face each other refer to coupling sections 40 that are coupled with each other.

First antenna 20 and second antenna 30 are provided on one end side and the other end side, respectively, with respect to a center of each car 10, a position where first antenna 20 is disposed being different from a position where second antenna 30 is disposed in the direction orthogonal to travel direction D1 of cars 10 in top view. Specifically, first antenna 20 is provided on an upper side of each car 10 shown in FIG. 2B, the upper side corresponding to the one end side of car 10 with respect to central virtual line C1 of car 10 shown in FIG. 2B. Further, second antenna 30 is provided on a lower side of each car 10 shown in FIG. 2B, the lower side corresponding to the other end of car 10 with respect to central virtual line C1 of car 10. Further, first antenna 20 and second antenna 30 are provided adjacent to a ceiling of each car 10.

A description will be given below of a more specific configuration of train communication system 1 with reference to FIG. 3.

Figure 3:
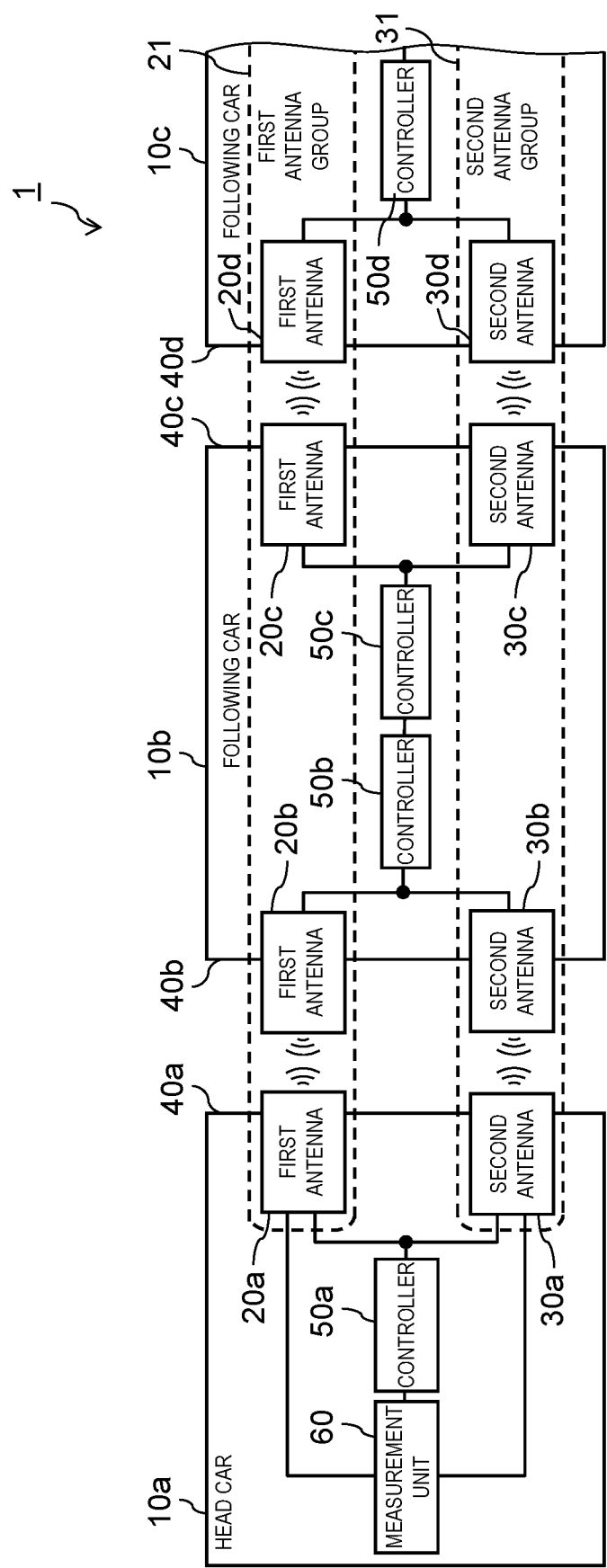
FIG. 3 is a block diagram showing an example of the train communication system according to the first exemplary embodiment.

FIG. 3 is a block diagram showing an example of train communication system 1 according to the first exemplary embodiment.

A train may be made up of at least two types of cars 10. The at least two types cars 10 include a leading car and a following car. In the first exemplary embodiment, the leading car corresponds to, for example, head car 10a. The following car corresponds to following car 10b to following car 10e (FIG. 3 shows neither following car 10d nor following car 10e). Note that following car 10b corresponds to a first following car of the present disclosure. Further, following car 10c corresponds to a second following car of the present disclosure. Head car 10a, and following car 10b to following car 10e are collectively referred to as car 10.

FIG. 3 further shows coupling section 40a to coupling section 40d. Coupling sections of cars 10 including coupling section 40a to coupling section 40d are collectively referred to as coupling section 40. Note that a section at a rear end of head car 10a corresponds to coupling section 40a, a section at a front end of following car 10b corresponds to coupling section 40b, a section at a rear end of following car 10b corresponds to coupling section 40c, and a section at a front end of following car 10c corresponds to coupling section 40d.

Train communication system 1 further includes first antenna group 21 including a pair of first antennas 20 and second antenna group 31 including a pair of second antennas 30. FIG. 3 shows, as the pair of first antennas 20, a pair of first antenna 20a (first antenna) and first antenna 20b (first antenna), and a pair of first antenna 20c (first following antenna) and first antenna 20d (first following antenna). FIG. 3 further shows, as the pair of second antennas 30, a pair of second antenna 30a (second antenna) and second antenna 30b (second antenna), and a pair of second antenna 30c (second following antenna) and second antenna 30d (second antenna).

On the assumption that the description is given based on a vertical direction of FIG. 3, first antenna 20a is disposed on an upper end side of coupling section 40a. Second antenna 30a is disposed on a lower end side of coupling section 40a. First antenna 20b is disposed on an upper end side of coupling section 40b. Second antenna 30b is disposed on a lower end side of coupling section 40b. First antenna 20a and first antenna 20b face each other. Second antenna 30a and second antenna 30b face each other. Likewise, first antenna 20c is disposed on an upper end side of coupling section 40c. Second antenna 30c is disposed on a lower end side of coupling section 40c. First antenna 20d is disposed on an upper end side of coupling section 40d. Second antenna 30d is disposed on a lower end side of coupling section 40d. First antenna 20c and first antenna 20d face each other. Second antenna 30c and second antenna 30d face each other.

That is, first antenna group 21 includes first antenna 20a to first antenna 20d disposed on the respective upper end sides of coupling section 40a to coupling section 40d. Second antenna group 31 includes second antenna 30a to second antenna 30d disposed on the respective lower end sides of coupling section 40a to coupling section 40d.

Communication between cars 10 is performed via either first antenna group 21 or second antenna group 31. Note that antennas including first antenna 20a to first antenna 20d that belong to first antenna group 21 are collectively referred to as first antenna 20, and antennas including second antenna 30a to second antenna 30d that belong to second antenna group 31 are collectively referred to as second antenna 30.

Train communication system 1 further includes controller 50 and measurement unit 60.

Measurement unit 60 measures at least one of radio wave strength between first antenna 20a and first antenna 20b or radio wave strength between second antenna 30a and second antenna 30b.

Controller 50 uses either first antenna group 21 or second antenna group 31 to perform communication. Specifically, controller 50 uses either first antenna group 21 or second antenna group 31 for data transfer (packet transfer). Note that cars 10 are provided with controller 50a to controller 50d, and controller 50a to controller 50d are collectively referred to as controller 50. Head car 10a is provided with controller 50a, and controller 50a uses either first antenna 20a or second antenna 30a to perform communication. Further, following car 10b is provided with controller 50b and controller 50c. Controller 50b uses either first antenna 20b or second antenna 30b to perform communication. Controller 50c uses either first antenna 20c or second antenna 30c to perform communication. This configuration also applies to the other following cars including following car 10c. That is, when communication is performed via first antenna group 21, the antennas belonging to first antenna group 21 (for example, first antenna 20a to first antenna 20d) are used for the communication, and when communication is performed via second antenna group 31, the antennas belonging to second antenna group 31 (for example, second antenna 30a to second antenna 30d) are used for the communication. Further, controller 50 (for example, controller 50a to controller 50d) is implemented by, for example, a processor or the like that executes a control program stored in a storage unit each car 10 includes. Alternatively, controller 50 may be implemented by a microcomputer or a dedicated circuit.

Further, as will be described in detail below, controller 50 switches between first antenna group 21 and second antenna group 31 for communication. For a smooth switch from a state where communication (data transfer) is performed via one antenna group to a state where communication (data transfer) is performed via the other antenna group, it is required that the pair of first antennas 20 and the pair of second antennas 30 has already established respective sessions. Therefore, it is required that communication between the pair of first antennas 20 and communication between the pair of second antennas 30 be periodically performed. This configuration may cause communication between the pair of first antennas 20 and communication between the pair of second antennas 30 to be performed simultaneously. To avoid interference on communication and the like, first antenna group 21 and second antenna group 31 preferably have different communication channels.

[Operation]

A description will be given below of an operation of train communication system 1 configured as described above.

Figure 4:
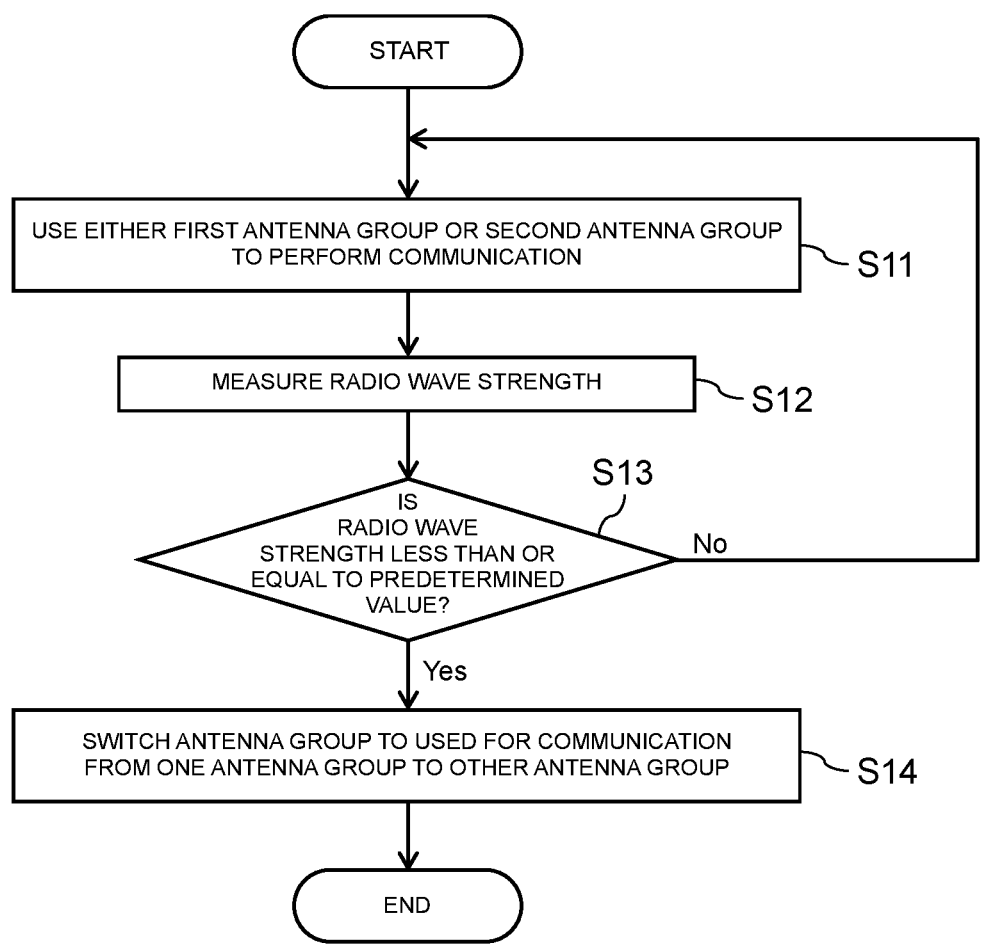
FIG. 4 is a flowchart showing an example of an operation of the train communication system according to the first exemplary embodiment.

FIG. 4 is a flowchart showing an example of the operation of train communication system 1 according to the first exemplary embodiment.

First, controller 50 uses either first antenna group 21 or second antenna group 31 to perform communication (step S11). In this exemplary embodiment, for example, it is assumed that controller 50 uses first antenna group 21 to perform communication.

Next, measurement unit 60 measures radio wave strength between first antenna 20a and first antenna 20b or between second antenna 30a and second antenna 30b (step S12). For example, during communication performed by controller 50 via first antenna group 21, measurement unit 60 measures radio wave strength (first radio wave strength) between first antenna 20a and first antenna 20b.

Next, controller 50 determines whether the radio wave strength measured by measurement unit 60 in step S12 is less than or equal to a predetermined value (a first predetermined value) (step S13). Specifically, controller 50 determines whether the radio wave strength between first antenna 20a and first antenna 20b measured by measurement unit 60 is less than or equal to the predetermined value. In this exemplary embodiment, the predetermined value corresponds to, for example, radio wave strength that leads to deterioration in throughput without interruption of communication between first antenna 20a and first antenna 20b and between second antenna 30a and second antenna 30b. For example, the predetermined value is equal to, for example, a value corresponding to a half of radio wave strength between first antenna 20a and first antenna 20b or between second antenna 30a and second antenna 30b, the radio wave strength being measured when cars 10 travel on a straight railway track. Note that the predetermined value is not limited to the above-described value and may be freely set by a user.

Upon determining that radio wave strength measured by measurement unit 60 is less than or equal to the predetermined value (Yes in step S13), controller 50 switches an antenna group to be used for communication from one antenna group to the other antenna group. Specifically, controller 50 switches an antenna group to be used for communication from first antenna group 21 to second antenna group 31.

In contrast, upon determining that the radio wave strength measured by measurement unit 60 is more than the predetermined value (No in step S13), controller 50 does not switch an antenna group to be used for communication from the one antenna group to the other antenna group. Specifically, controller 50 repeats processing from step S11 to continue communication via first antenna group 21.

As described above, when cars 10 travel on, for example, a curved railway track and then radio wave strength between antennas (between first antenna 20a and first antenna 20b or between second antenna 30a and second antenna 30b) belonging to the one antenna group that are in use for communication is less than or equal to the predetermined value, an antenna group to be used for communication is switched to the other antenna group.

Note that it is conceivable that measurement unit 60 measures both radio wave strength between first antenna 20a and first antenna 20b and radio wave strength between second antenna 30a and second antenna 30b, and controller 50 uses an antenna group having higher radio wave strength for communication. However, slight changes in radio wave strength may cause frequent switches between first antenna group 21 and second antenna group 31. Therefore, rather than a configuration where radio wave strength between first antenna 20a and first antenna 20b and radio wave strength between second antenna 30a and second antenna 30b are compared with each other and then an antenna group to be used for communication is selected based on the comparison result, as in the first exemplary embodiment, a configuration where radio wave strength between antennas that are in use and the predetermined value are compared with each other and then whether a switch is made between the antenna groups is determined based on the comparison result is suitable for further enhancing stability of a communication condition.

[Switch Between Antenna Groups]

Next, a description will be given below of an operation of train communication system 1 when an antenna group to be used for communication is switched from one antenna group to the other antenna group with reference to FIG. 5A to FIG. 8.

Figure 5A:
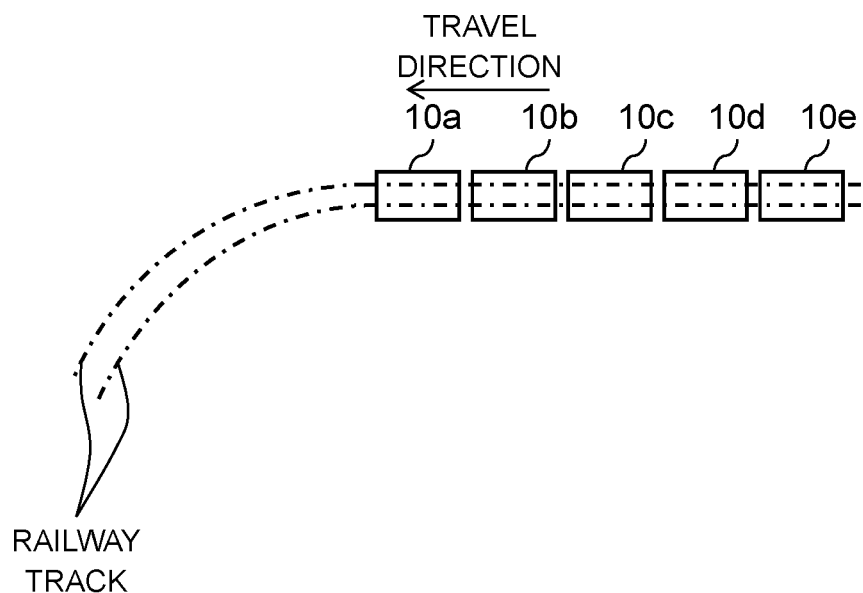
FIG. 5A is a diagram for describing a switch between antenna groups.
Figure 5B:
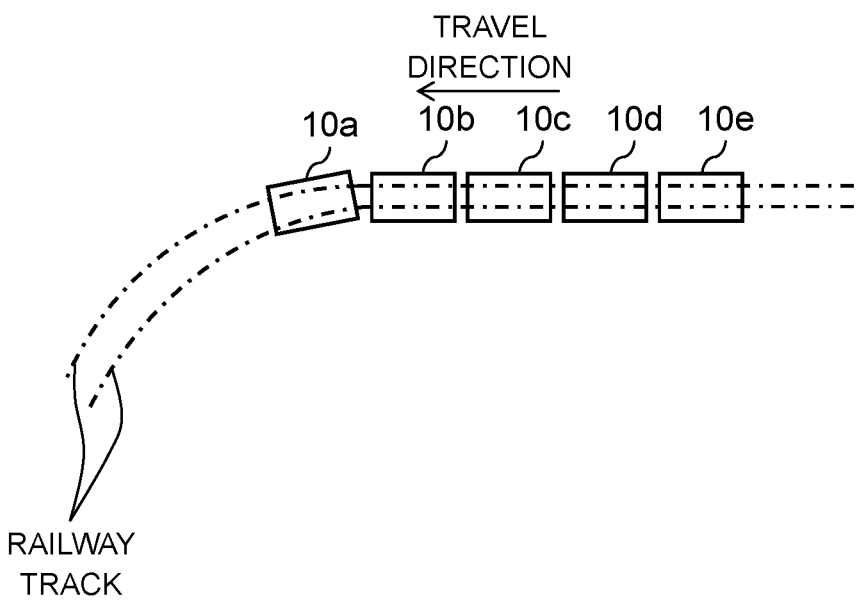
FIG. 5B is a diagram for describing a switch between antenna groups.

FIG. 5A and FIG. 5B are diagrams for describing a switch between antenna groups. FIG. 5A and FIG. 5B are schematic diagrams of cars 10 in top view. FIG. 5A and FIG. 5B shows railway tracks with an upper side of each of FIG. 5A and FIG. 5B corresponding to an outside of a curve. Further, it is assumed that first antenna 20 belonging to first antenna group 21 is installed on an upper side of each of FIG. 5A and FIG. 5B, the upper side corresponding to one end side of each car 10 in the direction orthogonal to the travel direction of cars 10 in top view. It is assumed that second antenna 30 belonging to second antenna group 31 is installed on a lower side of each of FIG. 5A and FIG. 5B, the lower side corresponding to the other end side of each car 10 in the direction orthogonal to the travel direction of cars 10 in top view.

As shown in FIG. 5A, it is assumed that, when cars 10 travel on a straight railway track, controller 50 uses first antenna group 21 as the one antenna group to perform communication. Next, as shown in FIG. 5B, it is assumed that, when head car 10a of cars 10 travels on a curved railway track, radio wave strength between first antenna 20a provided at coupling section 40a of head car 10a and first antenna 20b provided at coupling section 40b of following car 10b is less than or equal to the predetermined value.

To switch an antenna group to be used for communication from the one antenna group (first antenna group 21) to the other antenna group (second antenna group 31), controller 50 makes all switches from all antennas (first antenna 20) belonging to the one antenna group to all antennas (second antenna 30) belonging to the other antenna group at almost identical timing, for example. Specifically, controller 50a provided in head car 10a transmits, e.g., broadcasts, to controllers 50 provided in following car 10b to following car 10e, a command for causing each controller 50 to switch an antenna to be used for communication from first antenna 20 to second antenna 30. Accordingly, all antennas to be used for communication are switched from all first antennas 20 to all second antennas 30 at almost identical timing. Note that "almost identical timing" refers to a case where timing is not intentionally shifted. That is, "almost identical timing" includes not only a case where switches between pairs of antennas are made at exactly identical timing, but also a case where each of the switches between the pairs of antennas is made at slightly shifted timing.

As described above, in accordance with the command transmitted from controller 50a provided in head car 10a, all the switches from all the antennas belonging to the one antenna group to all the antennas belonging to the other antenna group are made at almost identical timing.

Note that all switches from antennas belonging to the one antenna group to antennas belonging to the other antenna group need not be made at almost identical timing.

To switch an antenna group to be used for communication from the one antenna group (first antenna group 21) to the other antenna group (second antenna group 31), controller 50 may switch from the pairs of antennas (the pairs of first antennas 20) belonging to the one antenna group to the pairs of antennas (the pairs of second antennas 30) belonging to the other antenna group in order from a pair of antennas located closer to head car 10a, for example. In this exemplary embodiment, a switch in order from a pair of antennas located closer to head car 10a refers to a switch of a pair of antennas to be used for communication that is successively made from head car 10a to last car 10, specifically, a switch that is made from the pair of first antenna 20a and first antenna 20b to the pair of second antenna 30a and second antenna 30b, and then, a switch is made from the pair of first antenna 20c and first antenna 20d to the pair of second antenna 30c and second antenna 30d. For example, when head car 10a travels on a curved railway track and then radio wave strength between first antenna 20a and first antenna 20b is less than or equal to the predetermined value, a switch is made from the pair of first antenna 20a and first antenna 20b to the pair of second antenna 30a and second antenna 30b. Subsequently, when following car 10b travels on the curved railway track, a switch is made from the pair of first antenna 20c and first antenna 20d to the pair of second antenna 30c and second antenna 30d.

At this time, controller 50 switches from the pairs of antennas (the pairs of first antennas 20) belonging to the one antenna group (first antenna group 21) to the pairs of antennas (the pairs of second antennas 30) belonging to the other antenna group (second antenna group 31) at timing corresponding to a speed of head car 10a in order from a pair of antennas located closer to head car 10a. This configuration will be described with reference to FIG. 6 and FIG. 7. Note that it is assumed that head car 10a includes a speed measurement unit that measures the speed of head car 10a.

FIG. 6 is a table showing examples of switch timing of the pairs of antennas between cars 10, the switch timing corresponding to the speed of head car 10a.

FIG. 7 is a table showing examples of a delay coefficient corresponding to the speed of head car 10a.

First, a description will be given of a configuration where a storage unit head car 10a includes stores in advance a table as is shown in FIG. 6. A time from when head car 10a travels on a curved railway track until when a following car (following car 10b to following car 10e) travels on the curved railway track may be predetermined based on the speed of head car 10a and a length of following car 10. Accordingly, as shown in FIG. 6, switch timing of a pair of antennas to be used for communication between following cars 10 may be predetermined based on the speed of head car 10a. For example, the lower the speed of head car 10a is, the longer a time from when head car 10a travels on a curved railway track until when following car 10 travels on the curved railway track becomes. In contrast, the higher the speed of head car 10a is, the shorter the time from when head car 10a travels on the curved railway track until when following car 10 travels on the curved railway track becomes.

A description will be given of a case where, for example, head car 10a travels at 50 km/h. When head car 10a travels on a curved railway track and then radio wave strength between first antenna 20a and first antenna 20b is less than or equal to the predetermined value, controller 50a transmits, to controller 50b, a command for switching an antenna to be used for communication from first antenna 20b to second antenna 30b. Then, controller 50a and controller 50b switch a pair of antennas to be used for communication between head car 10a and following car 10b from the pair of first antenna 20a and first antenna 20b to the pair of second antenna 30a and second antenna 30b. Next, with reference to the table shown in FIG. 6, a time from when a switch of the pair of antennas to be used for communication between head car 10a and following car 10b is made until when following car 10b travels on the curved railway track is estimated to be 1.5 seconds based on the speed (50 km/h) of head car 10a. Accordingly, in 1.5 seconds from the switch of the pair of antennas to be used for communication between head car 10a and following car 10b, a switch of a pair of antennas to be used for communication between following car 10b and following car 10c is made. Specifically, in 1.5 seconds, controller 50a transmits, to controller 50c, a command for switching an antenna to be used for communication from first antenna 20c to second antenna 30c and transmits, to controller 50d, a command for switching an antenna to be used for communication from first antenna 20d to second antenna 30d. Then, upon receiving the commands, controller 50c and controller 50d switch a pair of antennas to be used for communication from the pair of first antenna 20c and first antenna 20d to the pair of second antenna 30c and second antenna 30d. Likewise, in 3 seconds from the switch of the pair of antennas to be used for communication between head car 10a and following car 10b, a switch of a pair of antennas to be used for communication between following car 10c and following car 10d is made, and in 4.5 seconds, a switch of a pair of antennas to be used for communication between following car 10d and following car 10e is made.

As described above, at estimated timing where each following car 10 travels on the curved railway track, controller 50a may transmit the command for switching pairs of antennas to be used for communication to controller 50 of each following car 10. This configuration causes a switch from a pair of antennas belonging to the one antenna group to a pair of antennas belonging to the other antenna group to be made in order from a pair of antennas of car 10 located closer to head car 10a at timing corresponding to the speed of head car 10a.

Next, a description will be given of a configuration where the storage unit head car 10a includes stores in advance a table as is shown in FIG. 7.

When radio wave strength between first antenna 20a and first antenna 20b measured by measurement unit 60 is less than or equal to the predetermined value, controller 50a transmits, e.g., broadcasts, the following information to controller 50 of each following car 10. The information contains the command for causing each controller 50 to switch an antenna to be used for communication from first antenna 20 to second antenna 30 and a delay coefficient corresponding to the speed of head car 10a as is shown in FIG. 7. Then, in a time represented by a product of a value corresponding to a distance from head car 10a and the delay coefficient from reception of the information, controller 50 of each following car 10 switches an antenna to be used for communication from first antenna 20 to second antenna 30. The value corresponding to a distance from head car 10a is, for example, a value varying with a distance from head car 10a to each following car 10. The value is prestored in the storage unit of each following car 10. Specifically, the storage unit of each following car 10 stores a value corresponding to a distance from head car 10a, the value being used by controller 50 (for example, controller 50b) that controls antennas located at the front end of car 10, and a value corresponding to a distance from head car 10a, the value being used by controller 50 (for example, controller 50c) that controls antennas located at the rear end of car 10.

The lower the speed of head car 10a is, the longer the time from when head car 10a travels on a curved railway track until when following car 10 travels on the curved railway track becomes, thereby making the delay coefficient larger. In other words, the higher the speed of head car 10a is, the shorter the time from when head car 10a travels on the curved railway track until when following car 10 travels on the curved railway track becomes, thereby making the delay coefficient smaller. Further, for following car 10 closer to head car 10a out of following cars 10, the time from when head car 10a travels on the curved railway track until when following car 10 travels on the curved railway track becomes shorter, thereby causing controller 50 that controls antennas adjacent to head car 10a to use a small value as the value corresponding to a distance from head car 10a. In other words, for following car 10 closer to last car 10 out of following cars 10, the time from when head car 10a travels on the curved railway track until when following car 10 travels on the curved railway track becomes longer, thereby causing controller 50 that controls antennas remote from head car 10a to use a large value as the value corresponding to a distance from head car 10a. For example, controller 50b uses a value of 0 as the value corresponding to a distance from head car 10a, and controller 50c and controller 50d use a value of 1 as the value.

A description will be given of a case where, for example, head car 10a travels at 50 km/h. First, when radio wave strength between first antenna 20a and first antenna 20b measured by measurement unit 60 is less than or equal to the predetermined value, controller 50a transmits, e.g., broadcasts, the following information to controller 50 of each following car 10. The information contains the command for causing each controller 50 to make a switch of an antenna to be used for communication, and the delay coefficient. In a time represented by a product of a value of 0 corresponding to a distance from head car 10a and a delay coefficient of 1.5 from reception of the information from controller 50a, controller 50b switches an antenna to be used for communication from first antenna 20b to second antenna 30b. That is, upon receiving the information from controller 50a, controller 50b switches the antenna to be used for communication from first antenna 20b to second antenna 30b. Accordingly, when radio wave strength between first antenna 20a and first antenna 20b measured by measurement unit 60 is less than or equal to the predetermined value, controller 50a and controller 50b switch a pair of antennas to be used for communication from the pair of first antenna 20a and first antenna 20b to the pair of second antenna 30a and second antenna 30b. Further, in a time represented by a product of a value of 1 corresponding to a distance from head car 10a and the delay coefficient of 1.5 from reception of the information from controller 50a, controller 50c and controller 50d switches a pair of antennas to be used for communication from the pair of first antenna 20c and first antenna 20d to the pair of second antenna 30c and second antenna 30d. That is, in 1.5 seconds from the reception of the information from controller 50a, controller 50c and controller 50d switches the pair of antennas to be used for communication from the pair of first antenna 20c and first antenna 20d to the pair of second antenna 30c and second antenna 30d. Likewise, in a time represented by a product of a larger value corresponding to a distance from head car 10a and the delay coefficient of 1.5, controllers 50 of further following cars 10 switch a pair of antennas to be used for communication from the pair of first antennas 20 to the pairs of second antennas 30.

As described above, controller 50a transmits, e.g., broadcasts, information containing the command for switching antennas and the delay coefficient to controller 50 provided in each following car 10. Then, controller 50 of each following car 10 determines, based on the distance from head car 10a and the delay coefficient, timing at which a switch between antennas is made, thereby causing a switch from a pair of antennas belonging to the one antenna group to a pair of antennas belonging to the other antenna group to be made in order from a pair of antennas located closer to head car 10a at timing corresponding to the speed of head car 10a.

Further, after switching from the pair of antennas belonging to the one antenna group to the pair of antennas belonging to the other antenna group, the pairs of antennas being provided at coupling section 40a and coupling section 40b facing each other of head car 10a and following car 10 (following car 10b) coupled with head car 10a, controller 50 may switch pairs of antennas in order from a pair of antennas of following car 10 located closer to head car 10a at timing corresponding to a speed of each following car 10. Note that each following car 10 includes a speed measurement unit that measures its own speed.

Specifically, when radio wave strength between first antenna 20a and first antenna 20b measured by measurement unit 60 is less than or equal to the predetermined value, controller 50a transmits, to controller 50b, the command for switching an antenna to be used for communication from first antenna 20b to second antenna 30b. Then, controller 50a and controller 50b switch antennas to be used for communication between head car 10a and following car 10b from the pair of first antenna 20a and first antenna 20b to the pair of second antenna 30a and second antenna 30b. Next, controller 50b transmits, to controller 50c, information indicating that the antennas have been switched. Controller 50c calculates, from the speed of following car 10b, timing at which a switch of a pair of antennas to be used for communication between following car 10b and following car 10c is made. Then, in the time thus calculated from the reception of the information, controller 50c transmits, to controller 50d, the command for switching an antenna to be used for communication from first antenna 20d to second antenna 30d. Then, controller 50c and controller 50d switch a pair of antennas to be used for communication between following car 10b and following car 10c from the pair of first antenna 20c and first antenna 20d to the pair of second antenna 30c and second antenna 30d.

As described above, in order from a pair of antennas of following car 10 located closer to head car 10a, a switch of a pair of antennas is made at timing corresponding to the speed of each following car 10. That is, the command for making a switch of an antenna to be used for communication is relayed from head car 10a to last car 10 at timing corresponding to the speed of each following car 10.

Further, all pairs of antennas to be used for communication between cars 10 need not necessarily be switched. This will be described with reference to FIG. 8.

Figure 8:
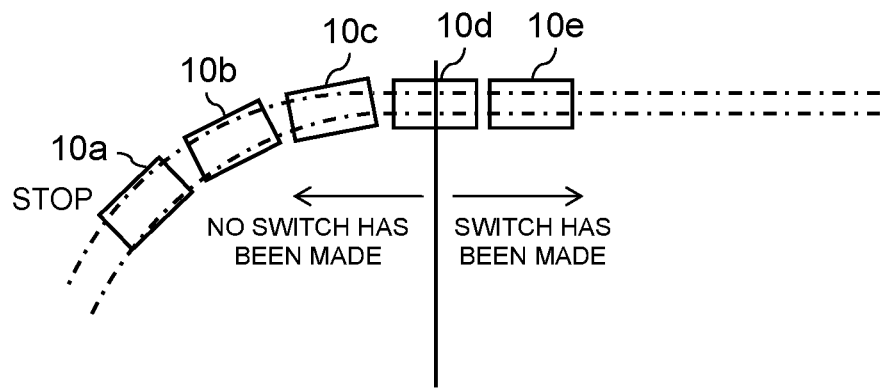
FIG. 8 is a diagram showing a state where switches of pairs of antennas to be used for communication between some of a plurality of cars are made.

FIG. 8 is a diagram showing a state where switches of pairs of antennas to be used for communication between some of a plurality of cars are made. FIG. 8 is a schematic diagram of cars 10 in top view.

As shown in FIG. 8, in some cases, some cars 10 stop on a curved railway track, and other cars 10 stop on a straight railway track. For example, in FIG. 8, head car 10a, following car 10b, and following car 10c stop on the curved railway track, and following car 10d and following car 10e stop on the straight railway track. For example, a station having a partially curved platform may cause such a state as is shown in FIG. 8. Further, for example, a case where a traffic signal is located beside a curved railway track may cause such a state as is shown in FIG. 8. Such cases eliminate the need for, for example, a switch of a pair of antennas to be used for communication between following car 10d and following car 10e.

For example, it is assumed that head car 10a has a function of locating a position of head car 10a with the help of the global positioning system (GPS). Further, it is assumed that controller 50 makes a switch of an antenna to be used for communication based on the position located by the GPS. Accordingly, a configuration where controller 50 preliminarily recognizes such a stop position as is shown in FIG. 8 allows some pairs of antennas to be controlled separately from the antenna group on a temporary basis and thus eliminates the need for the switch. In the example shown in FIG. 8, a switch of a pair of antennas to be used for communication between following car 10d and following car 10e is not made. Note that when cars 10 pull away from the stop position, the switch of a pair of antennas to be used for communication between following car 10d and following car 10e may be made. That is, when cars 10 pull away, a pair of antennas to be used for communication between following car 10d and following car 10e may be controlled again as a pair of antennas belonging to the antenna group. As described above, based on the positions of cars 10, some antennas need not be switched.

Furthermore, such a curved railway track may have an S-shape. The communication condition may also deteriorate when cars 10 travel on an S-shaped railway track, and this will be described with reference to FIG. 9.

Figure 9:
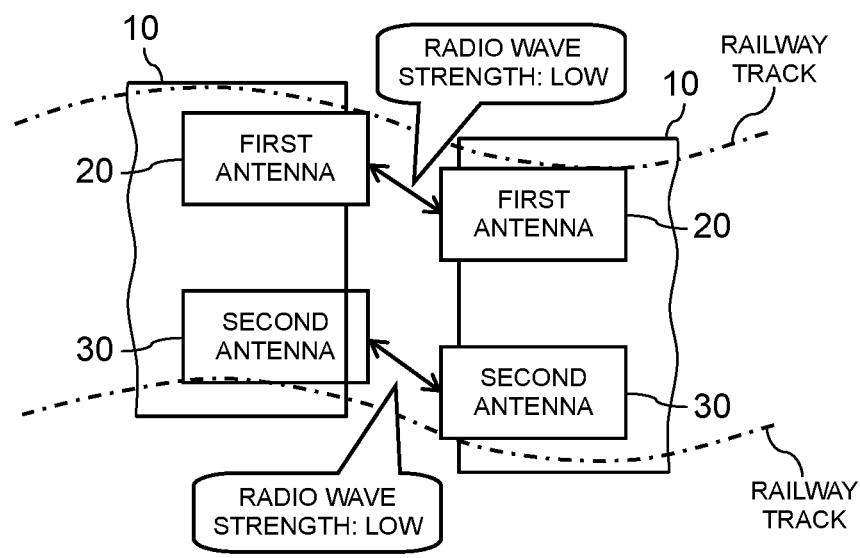
FIG. 9 is a diagram for describing a situation where a communication condition deteriorates when cars travel on an S-shaped railway track.

FIG. 9 is a diagram for describing a situation where the communication condition deteriorates when cars 10 travel on an S-shaped railway track. FIG. 9 is a schematic diagram of cars 10 in top view.

As shown in FIG. 9, when cars 10 travel on an S-shaped railway track, the train may be brought into a displaced state. In this case, both radio wave strength between first antennas 20 and radio wave strength between second antennas 30 may become lower. Accordingly, even when pairs of antennas are switched, radio wave strength may remain low.

Therefore, when radio wave strength measured by measurement unit 60 is less than or equal to the predetermined value, measurement unit 60 may measure radio wave strength between antennas belonging to the other antenna group that has not used by controller 50 for communication. For example, when radio wave strength, measured by measurement unit 60, between first antenna 20a and first antenna 20b belonging to first antenna group 21 that have been used by controller 50 for communication is less than or equal to the predetermined value, measurement unit 60 may measure radio wave strength (second radio wave strength) between second antenna 30a and second antenna 30b belonging to second antenna group 31 that have not been used by controller 50 for communication. This allows determination whether radio wave strength between antennas belonging to the other antenna group becomes lower to be made. Then, when radio wave strength, measured by measurement unit 60, between antennas belonging to the other antenna group is less than or equal to a predetermined value (a second predetermined value), controller 50 switches a modulation scheme for communication to a modulation scheme that is tolerant of transmission errors (as a result, a communication distance becomes longer). That is, when both radio wave strength between first antenna 20a and first antenna 20b belonging to first antenna group 21 and radio wave strength between second antenna 30a and second antenna 30b belonging to second antenna group 31 become lower, a switch of an antenna to be used for communication fails to prevent the communication condition from deteriorating. Therefore, with first antenna group 21 kept in use, a switch is made to a modulation scheme that makes the communication distance longer without at least causing communication to be interrupted. For example, the modulation scheme is switched from the quadrature phase shift keying (QPSK) scheme to the binary phase shift keying (BPSK) scheme. This switch makes the maximum throughput lower, but makes the communication distance longer. Note that after an antenna group to be used for communication is switched from first antenna group 21 to second antenna group 31, a switch of the modulation scheme of the second antenna group may be made. Further, the predetermined value (the first predetermined value) to be compared with radio wave strength between first antennas 20 and the predetermined value (the second predetermined value) to be compared with radio wave strength between second antennas 20 are determined in accordance with their respective antenna characteristics; thus, the predetermined values may be identical to or different from each other.

As described above, when both radio wave strength between first antenna 20a and first antenna 20b and radio wave strength between second antenna 30a and second antenna 30b become lower such as when the train is brought into a displaced state on an S-shaped curve, the modulation scheme for communication may be switched to a modulation scheme that is tolerant of transmission errors.

[Effects and the Like]

As described above, according to the first exemplary embodiment, train communication system 1 is a system that uses low power radio to perform communication between cars 10. Train communication system 1 includes first antenna group 21, second antenna group 31, measurement unit 60, and controller 50a. First antenna group 21 includes at least first antenna 20a and first antenna 20b that are arranged facing each other. First antenna 20a is disposed at coupling section 40a of head car 10a. First antenna 20b is disposed at coupling section 40b of following car 10b. Second antenna group 31 includes at least second antenna 30a and second antenna 30b that are arranged facing each other. Second antenna 30a is disposed at the coupling section of head car 10a. Second antenna 30a is disposed at a position different from the position where first antenna 20a is disposed in the direction orthogonal to the travel direction of head car 10a in top view. Second antenna 30b is disposed at coupling section 40b of following car 10b. Measurement unit 60 measures, for example, during communication via first antenna group 21, radio wave strength between first antenna 20a and first antenna 20b. When the radio wave strength thus measured is less than the predetermined value, controller 50a may switch an antenna group to be used for communication from first antenna group 21 to the second antenna group.

The pair of first antenna 20a and first antenna 20b and the pair of second antenna 30a and second antenna 30b are respectively provided at coupling section 40a and coupling section 40b that face each other, for example, for fail-safe behavior, the position where the pair of first antenna 20a and first antenna 20b are disposed being different from the position where the pair of second antenna 30a and second antenna 30b are disposed in the direction orthogonal to the travel direction of head car 10a in top view. Here, when head car 10a travels on a curved railway track, a space between coupling section 40a and coupling section 40b becomes wider toward an outer side of the curve. In other words, when head car 10a travels on the curved railway track, the space between coupling section 40a and coupling section 40b becomes narrower toward an inner side of the curve. When head car 10a travels on a curved railway track and then radio wave strength measured by measurement unit 60 is less than or equal to the predetermined value, the reduction in the radio wave strength is often due to the fact that communication is performed via the one antenna group provided on the outer side of the curve. Therefore, a switch of an antenna group to be used for communication to the other antenna group adjacent to the inner side of the curve improves the communication condition. As described above, deterioration in the communication condition can be prevented when, for example, cars 10 travel on a curved railway track.

Further, according to the first exemplary embodiment, the plurality of cars 10 include head car 10a, and at least two following cars including following car 10b and following car 10c. First antenna group 21 further includes first antenna 20c and first antenna 20d that are arranged facing each other. First antenna 20c is disposed at coupling section 40c of following car 10b. First antenna 20d is disposed at coupling section 40d of following car 10c. Second antenna group 31 further includes second antenna 30c and second antenna 30d that are arranged facing each other. Second antenna 30c is disposed at coupling section 40c of following car 10b, the position where second antenna 30c is disposed being different from the position where first antenna 20c is disposed in a direction orthogonal to a travel direction of following car 10b in top view. Second antenna 30d is disposed at coupling section 40d of following car 10c.

That is, the position of the pair of first antennas 20 provided at each pair of coupling sections 40 that face each other and the position of the pair of second antennas 30 provided at each pair of coupling sections 40 that face each other are different from each other in the direction orthogonal to the travel direction of cars 10 in top view. For example, the pair of first antennas 20 is provided at a position close to one end side in the direction orthogonal to the travel direction, compared with a position where the pair of second antennas 30 are provided. Further, when cars 10 travel on a railway track and head car 10a travels on a curved railway track, following car 10b and following car 10c also travel on the curved railway track. Accordingly, a change in radio wave strength occurs in a similar manner between the pair of antennas of head car 10a and following car 10b and between the pair of antennas of following cars 10 that have a positional relationship similar to a positional relationship between the pair of antennas of head car 10a and following car 10b. This eliminates the need for measuring radio wave strength between all cars 10. That is, measurement unit 60 need not be provided between all cars. Only one measurement unit 60 that measures radio wave strength between head car 10a and following car 10b needs to be provided. That is, in accordance with a measurement result from only one measurement unit 60, a switch of an antenna group to be used for communication between head car 10a and at least two following cars including following car 10b and following car 10c can be made from the one antenna group to the other antenna group.

Further, according to the first exemplary embodiment, first antenna 20a and second antenna 30a are disposed on the one end side and the other end side, respectively, with respect to the center of head car 10a in the direction orthogonal to the travel direction of head car 10a in top view.

Accordingly, when head car 10a travels on a curved railway track, a difference between radio wave strength between the pair of antennas belonging to the one antenna group and radio wave strength between the pair of antennas belonging to the other antenna group becomes larger. That is, radio wave strength between the pair of antennas adjacent to the outer side of the curve becomes lower, and radio wave strength between the pair of antennas adjacent to the inner side of the curve becomes higher. Therefore, when head car 10a travels on, for example, a curved railway track and then radio wave strength between the pair of antennas belonging to the one antenna group that are in use for communication is less than or equal to the predetermined value, a switch to the other antenna group is made, thereby preventing the communication condition from deteriorating.

Note that first antenna 20a and first antenna 20b are arranged facing each other. Further, second antenna 30a and second antenna 30b are arranged facing each other. Therefore, when first antenna 20a and second antenna 30a are disposed on the one end side and the other end side, respectively, with respect to the center of head car 10a in the direction orthogonal to the travel direction of head car 10a in top view, first antenna 20b and second antenna 30b are similarly disposed on the one end side and the other end side, respectively, with respect to a center of following car 10b in the direction orthogonal to the travel direction of following car 10b in top view.

Further, according to the first exemplary embodiment, first antenna 20c and second antenna 30c are disposed on the one end side and the other end side, respectively, with respect to the center of following car 10b in the direction orthogonal to the travel direction of following car 10b in top view. Likewise, first antenna 20d and second antenna 30d are disposed on the one end side and the other end side, respectively, with respect to a center of following car 10c in a direction orthogonal to a travel direction of following car 10c in top view. This configuration prevents, even when cars 10 travel on a curved railway track, the communication condition from deteriorating.

Further, according to the first exemplary embodiment, first antenna group 21 and second antenna group 31 have different communication channels.

For a smooth switch from a state where communication (data transfer) is performed via the one antenna group to a state where communication (data transfer) is performed via the other antenna group, it is required that the pair of first antennas 20 and the pair of second antennas 30 have already established respective sessions. This configuration requires that communication between the pair of first antennas 20 and communication between the pair of second antennas 30 be periodically performed, which may cause the communication to be performed simultaneously. Accordingly, the configuration where first antenna group 21 and second antenna group 31 have different communication channels prevents interference on communication between first antenna group 21 and second antenna group 31.

According to the first exemplary embodiment, to switch an antenna group to be used for communication from the one antenna group to the other antenna group, controller 50a makes all switches from all antennas belonging to the one antenna group to all antennas belonging to the other antenna group at almost identical timing.

As shown in FIG. 5A and FIG. 5B, a typical railway track, in many cases, extends straight and then curves. As shown in FIG. 5B, such a shape tends to cause, when head car 10a travels on a curved railway track, following car 10b to following car 10e to travel on a straight railway track. At this time, following car 10b to following car 10e travel on the straight railway track; thus, regardless of whether communication is performed via first antenna group 21 or second antenna group 31, the communication condition is less likely to deteriorate. Thus, when head car 10a travels on the curved railway track and then radio wave strength is less than or equal to the predetermined value, a problem is less likely to arise even when all switches from all antennas belonging to the one antenna group to all antennas belonging to the other antenna group are made at almost identical timing. Further, with, for example controller 50 provided in each car 10, one controller 50 (for example, controller 50a) only broadcasts a switch command to the other controllers 50, so that all the switches are easily made at almost identical timing.

Further, according to the first exemplary embodiment, to switch an antenna group to be used for communication from the one antenna group to the other antenna group, controller 50 switches from the pairs of antennas belonging to the one antenna group to the pairs of antennas belonging to the other antenna group in order from a pair of antennas located closer to head car 10a.

At this time, controller 50 may make the switch in order from a pair of antennas located closer to head car 10a at timing corresponding to the speed of head car 10a.

Alternatively, after switching from the pair of antennas belonging to the one antenna group to the pair of antennas belonging to the other antenna group, the pairs of antennas being provided at coupling section 40a and coupling section 40b facing each other of head car 10a and following car 10 (following car 10b) coupled with head car 10a, controller 50 may switch pairs of antennas of following car 10b to following car 10e in order from a pair of antennas located closer to head car 10a at timing corresponding to the speed of each following car 10.

This configuration allows, at estimated timing where each car 10 travels on a curved railway track, a switch from the pair of antennas belonging to the one antenna group to the pair of antennas belonging to the other antenna group of each car 10 to be made.

Further, according to the first exemplary embodiment, when radio wave strength, measured by measurement unit 60, between antennas belonging to the one antenna group that have been used by controller 50 for communication is less than or equal to the predetermined value and radio wave strength, measured by measurement unit 60, between antennas belonging to the other antenna group is less than or equal to the predetermined value, controller 50 switches the modulation scheme for communication to a modulation scheme that is tolerant of transmission errors.

This configuration at least prevents communication from being interrupted even when the train is brought into a displaced state on, for example, an S-shaped curve and then both radio wave strength between the pair of first antennas 20 and radio wave strength between the pair of second antennas become lower.

Second Exemplary Embodiment

A second exemplary embodiment will be described below with reference to FIG. 10.

[Configuration]

Figure 10:
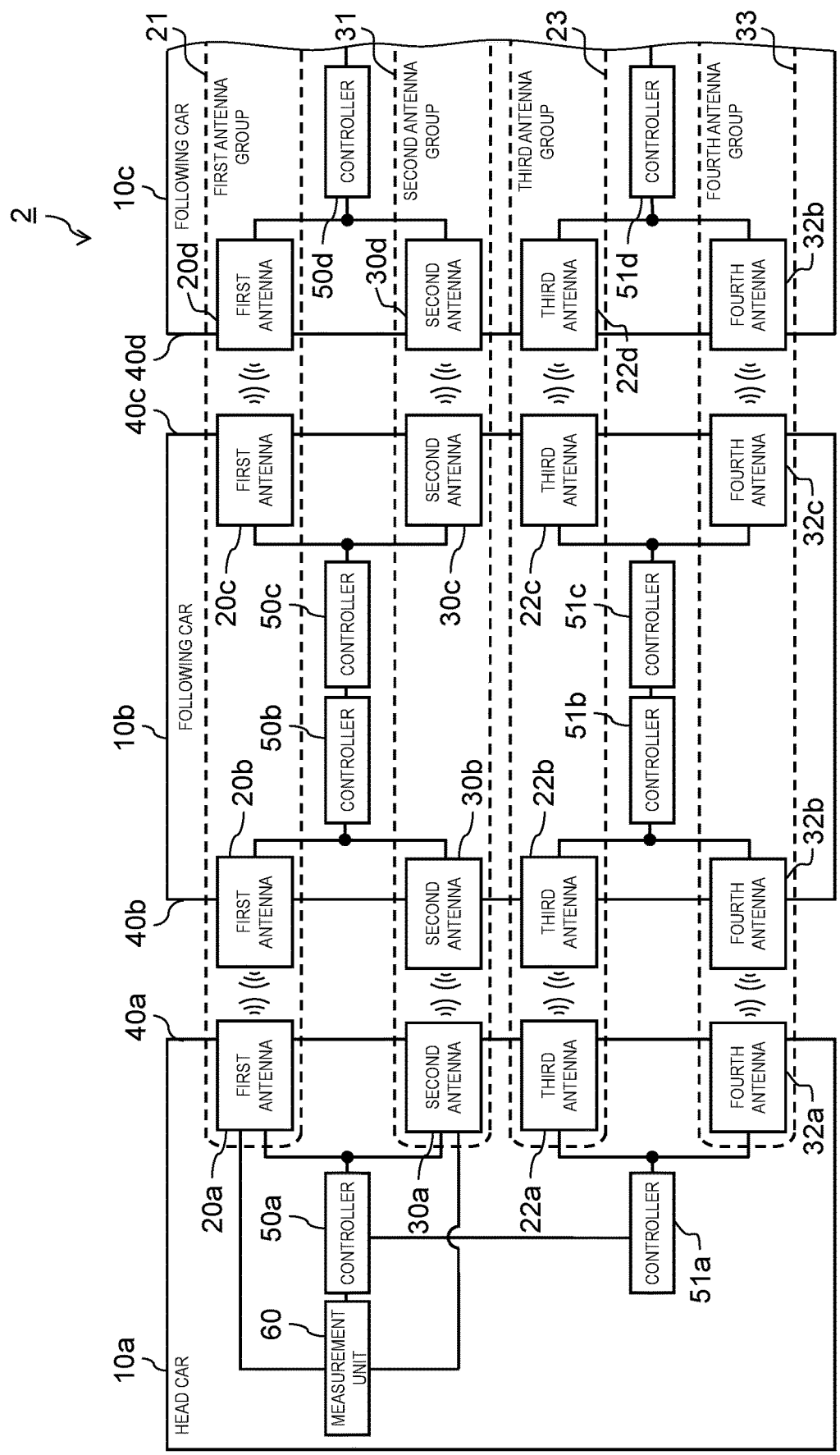
FIG. 10 is a block diagram showing an example of a train communication system according to a second exemplary embodiment.

FIG. 10 is a block diagram showing an example of train communication system 2 according to the second exemplary embodiment.

Train communication system 2 includes third antenna group 23 and fourth antenna group 33 in addition to the components of train communication system 1. Third antenna group 23 includes at least a pair of third antennas 22. Fourth antenna group 33 includes at least a pair of fourth antennas 32. Train communication system 2 includes, for fail-safe behavior, third antenna group 23 and fourth antenna group 33. First antenna group 21 and second antenna group 31, and third antenna group 23 and fourth antenna group 33 form respective loops.

FIG. 10 shows a configuration where third antenna group 23 includes, as pairs of third antennas 22, a pair of third antenna 22a and third antenna 22b, and a pair of third antenna 22c and third antenna 22d. Further, fourth antenna group 33 includes, as pairs of fourth antennas 32, a pair of fourth antenna 32a and fourth antenna 32b, and a pair of fourth antenna 32c and fourth antenna 32d.

Third antenna 22a is disposed at coupling section 40a of head car 10a. Third antenna 22b is disposed at coupling section 40b of following car 10b. Third antenna 22a and third antenna 22b are arranged facing each other.

Fourth antenna 32a is disposed at coupling section 40a of head car 10a. Fourth antenna 32b is disposed at coupling section 40b of following car 10b. Fourth antenna 32a and fourth antenna 32b are arranged facing each other.

Third antenna 22c is disposed at coupling section 40c of following car 10b. Third antenna 22d is disposed at coupling section 40d of following car 10c. Third antenna 22c and third antenna 22d are arranged facing each other.

Fourth antenna 32c is disposed at coupling section 40c of following car 10b. Fourth antenna 32d is disposed at coupling section 40d of following car 10c. Fourth antenna 32c and fourth antenna 32d are arranged facing each other.

Communication between cars 10 is performed via either first antenna group 21 and third antenna group 23 or second antenna group 31 and fourth antenna group 33. Note that antennas including third antenna 22a to third antenna 22d that belong to third antenna group 23 are collectively referred to as third antenna 22, and antennas including fourth antenna 32a to fourth antenna 32d that belong to fourth antenna group 33 are collectively referred to as fourth antenna 32.

First antenna 20 is provided at a position closer to one end side in a direction orthogonal to a travel direction of car 10 in top view, compared with second antenna 30. Third antenna 22 is provided at a position close to the one end side compared with fourth antenna 32. That is, a relationship between the position of first antenna 20 and the position of second antenna 30, and a relationship between the position of third antenna 22 and the position of fourth antenna 32 are identical to each other. For example, when first antenna 20 is provided at a position close to an upper side in the direction orthogonal to the travel direction compared with second antenna 30, third antenna 22 is provided at a position close to the upper side in the direction orthogonal to the travel direction compared with fourth antenna 32.

Further, according to the second exemplary embodiment, first antenna 20 and second antenna 30 are disposed on an upper side with respect to a center of car 10 in the direction orthogonal to the travel direction of car 10 in top view. Further, third antenna 22 and fourth antenna 32 are disposed on a lower side with respect to the center of car 10 in the direction orthogonal to the travel direction of car 10 in top view.

Further, controller 50 according to the second exemplary embodiment uses either first antenna group 21 and third antenna group 23 or second antenna group 31 and fourth antenna group 33 to perform communication. Cars 10 are provided with controller 51a to controller 51d. Controller 51a to controller 51d together with controller 50a to controller 50d are collectively referred to as controller 50. Head car 10a is provided with controller 51a. Controller 51a uses either third antenna 22a or fourth antenna 32a to perform communication. Further, following car 10b is provided with controller 51b and controller 51c. Controller 51b uses either third antenna 22b or fourth antenna 32b to perform communication. Controller 51c uses either third antenna 22c or fourth antenna 32c to perform communication. This configuration also applies to the other following cars including following car 10c. That is, when communication is performed via third antenna group 23, the antennas (for example, third antenna 22a to third antenna 22d) belonging to third antenna group 23 are used for the communication. When communication is performed via fourth antenna group 33, the antennas (for example, fourth antenna 32a to fourth antenna 32d) belonging to fourth antenna group 33 are used for the communication. Further, controller 50 (for example, controller 51a to controller 51d) is implemented by, for example, a processor or the like that executes a control program stored in a storage unit each car 10 includes. Alternatively, controller 50 may be implemented by a microcomputer or a dedicated circuit.

The other configurations are identical to the configurations of train communication system 1 according to the first exemplary embodiment; thus, descriptions of the other configurations will be omitted.

[Operation]

A description will be given below of an operation of train communication system 2 configured as described above.

Controller 50 uses either first antenna group 21 and third antenna group 23 or second antenna group 31 and fourth antenna group 33 to perform communication. In this exemplary embodiment, for example, it is assumed that controller 50 uses first antenna group 21 and third antenna group 23 to perform communication.

Next, measurement unit 60 measures radio wave strength between antennas belonging to one antenna group that have been used by controller 50 for communication, the antennas corresponding to either first antenna 20a and first antenna 20b or second antenna 30a and second antenna 30b. Specifically, measurement unit 60 measures radio wave strength between first antenna 20a and first antenna 20b belonging to first antenna group 21 that have been used by controller 50 for communication.

Next, controller 50 determines whether the radio wave strength, measured by measurement unit 60, between the antennas belonging to the one antenna group that have been used by controller 50 for communication is less than or equal to the predetermined value. Specifically, controller 50 determines whether the radio wave strength between first antenna 20a and first antenna 20b measured by measurement unit 60 is less than or equal to the predetermined value.

Upon determining that radio wave strength measured by measurement unit 60 is less than or equal to the predetermined value, controller 50 switches an antenna group to be used for communication from the one antenna group to the other antenna group. That is, controller 50 switches antenna groups to be used for communication from first antenna group 21 and third antenna group 23 to second antenna group 31 and fourth antenna group 33.

As described above, when cars 10 travel on, for example, a curved railway track and then radio wave strength between antennas in use for communication (between first antenna 20a and first antenna 20b or between second antenna 30a and second antenna 30b) that belong to either first antenna group 21 or second antenna group 31 is less than or equal to the predetermined value, an antenna group to be used for communication is switched to the other antenna group.

[Effects and the Like]

As described above, train communication system 2 according to the second exemplary embodiment further includes third antenna group 23 and fourth antenna group 33. The third antenna group is enabled to communicate together with first antenna group 21. The third antenna group includes at least third antenna 22a and third antenna 22b that are arranged facing each other. Third antenna 22a is disposed at coupling section 40a of leading car 10a. Third antenna 22b is disposed at coupling section 40b of following car 10b. Fourth antenna group 33 is enabled to communicate together with second antenna group 31. Fourth antenna group 33 includes at least fourth antenna 32a and fourth antenna 32b that are arranged facing each other. Fourth antenna 32a is disposed at coupling section 40a of leading car 10a, the position where fourth antenna 32a is disposed being different from the position where third antenna 22a is disposed in a direction orthogonal to a travel direction of leading car 10a. Fourth antenna 32b is disposed at coupling section 40b of following car 10b. When radio wave strength is less than the predetermined value during communication via first antenna group 21 and third antenna group 23, controller 50a may switch antenna groups to be used for communication from first antenna group 21 and third antenna group 23 to second antenna group 31 and fourth antenna group 33.

The configuration where first antenna 20 is provided at a position close to one end side in the direction orthogonal to the travel direction compared with second antenna 30 and third antenna 22 is provided at a position close to the one end side compared with fourth antenna 32 causes radio wave strength between first antennas 20 and radio wave strength between third antennas 22 when cars 10 travel on a curved railway track to change in the same manner and also causes radio wave strength between second antennas 30 and radio wave strength between fourth antennas 32 to change in the same manner. This eliminates the need for measurement unit 60 that measures radio wave strength between third antenna 22a and third antenna 22b or between fourth antenna 32a and fourth antenna 32b, and only one measurement unit 60 that measures radio wave strength between first antenna 20a and first antenna 20b or between second antenna 30a and second antenna 30b needs to be provided. For example, when an antenna group to be used for communication is switched from first antenna group 21 to second antenna group 31, even without measurement of radio wave strength between third antenna 22a and third antenna 22b or between fourth antenna 32a and fourth antenna 32b, an antenna group to be used for communication may be switched from third antenna group 23 to fourth antenna group 33. Accordingly, in accordance with the measurement result of radio wave strength measured by one measurement unit 60, not only a switch between first antenna group 21 and second antenna group 31, but also a switch between third antenna group 23 and fourth antenna group 33 may be made.

Third Exemplary Embodiment

Figure 11:
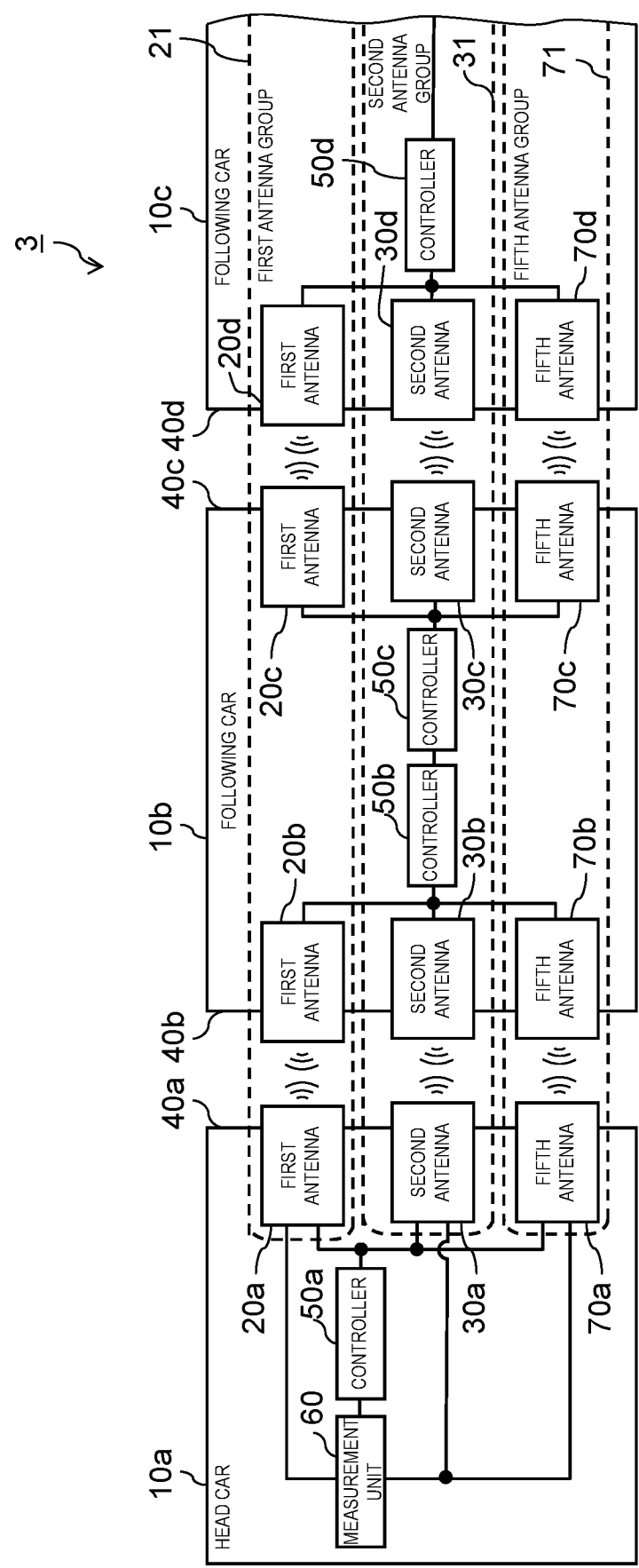
FIG. 11 is a block diagram showing an example of a train communication system according to a third exemplary embodiment.

A third exemplary embodiment will be described below with reference to FIG. 11.
[Configuration]
FIG. 11 is a block diagram showing an example of train communication system 3 according to the third exemplary embodiment.

Train communication system 3 includes fifth antenna group 71 in addition to the components of train communication system 1. Fifth antenna group 71 includes at least a pair of fifth antennas 70. Train communication system 3 includes, for fail-safe behavior, fifth antenna group 71 in addition to first antenna group 21 and second antenna group 31.

FIG. 11 shows a configuration where fifth antenna group 71 includes, as pairs of fifth antennas 70, a pair of fifth antenna 70a and fifth antenna 70b and a pair of fifth antenna 70c and fifth antenna 70d.

Fifth antenna 70a is disposed at coupling section 40a of head car 10a. Fifth antenna 70b is disposed at coupling section 40b of following car 10b. Fifth antenna 70a and fifth antenna 70b are arranged facing each other.

Fifth antenna 70c is disposed at coupling section 40c of following car 10b. Fifth antenna 70d is disposed at coupling section 40d of following car 10c. Fifth antenna 70c and fifth antenna 70d are arranged facing each other.

Communication between cars 10 is performed via first antenna group 21, second antenna group 31, or fifth antenna group 71. Note that antennas including fifth antenna 70a to 70d that belong to fifth antenna group 71 are collectively referred to as fifth antenna 70.

According to the third exemplary embodiment, first antenna 20 is disposed on an upper side with respect to a center of car 10 in a direction orthogonal to a travel direction of car 10 in top view. Further, fifth antenna 70 is disposed on a lower side with respect to the center of car 10 in the direction orthogonal to the travel direction of car 10 in top view. Further, second antenna 30 is disposed at an intermediate position between first antenna 20 and fifth antenna 70 in the direction orthogonal to the travel direction of car 10 in top view.

Measurement unit 60 according to the third exemplary embodiment measures radio wave strength between first antenna 20a and first antenna 20b, radio wave strength between second antenna 30a and second antenna 30b, and radio wave strength between fifth antenna 70a and fifth antenna 70b.

Further, controller 50 according to the third exemplary embodiment uses first antenna group 21, second antenna group 31, or fifth antenna group 71 to perform communication.

The other configurations are identical to the configurations of train communication system 1 according to the first exemplary embodiment; thus, descriptions of the other configurations will be omitted.
[Operation]
A description will be given below of an operation of train communication system 3 configured as described above.

Controller 50 uses first antenna group 21, second antenna group 31, or fifth antenna group 71 to perform communication. In this exemplary embodiment, for example, it is assumed that controller 50 uses first antenna group 21 to perform communication.

Next, measurement unit 60 measures radio wave strength between antennas belonging to one antenna group that have been used by controller 50 for communication, the antennas corresponding to first antenna 20a and first antenna 20b, second antenna 30a and second antenna 30b, or fifth antenna 70a and fifth antenna 70b. Specifically, measurement unit 60 measures radio wave strength between first antenna 20a and first antenna 20b belonging to first antenna group 21 that have been used by controller 50 for communication.

Next, controller 50 determines whether the radio wave strength measured by measurement unit 60 is less than or equal to the predetermined value. Specifically, controller 50 determines whether the radio wave strength between first antenna 20a and first antenna 20b measured by measurement unit 60 is less than or equal to the predetermined value.

Upon determining that the radio wave strength measured by measurement unit 60 is less than or equal to the predetermined value, controller 50 switches an antenna group to be used for communication from one antenna group to one of other antenna groups. At this time, measurement unit 60 measures radio wave strength between antennas belonging to all the other antenna groups. Then, the controller makes a switch to an antenna group to which antennas having the highest radio wave strength belong, out of antennas belonging to all the other antenna groups. For example, measurement unit 60 measures radio wave strength between second antenna 30a and second antenna 30b and radio wave strength between fifth antenna 70a and fifth antenna 70b. Then, when the radio wave strength between fifth antenna 70a and fifth antenna 70b is higher than the radio wave strength between second antenna 30a and second antenna 30b, controller 50a switches an antenna group to be used for communication from first antenna group 21 to fifth antenna group 71.

As described above, when cars 10 travel on, for example, a curved railway track and then radio wave strength, measured by measurement unit 60, between antennas belonging to the one antenna group that have been used by controller 50 for communication is less than or equal to the predetermined value, a switch is made to an antenna group to which antennas having the highest radio wave strength belong.
[Effects and the Like]
As described above, train communication system 3 according to the third exemplary embodiment further includes fifth antenna group 71. Fifth antenna group 71 includes at least fifth antenna 70a and fifth antenna 70b that are arranged facing each other. Fifth antenna 70a is disposed at coupling section 40a of head car 10a, the position where fifth antenna 70a is disposed being different from either the position where first antenna 20a is disposed or the position where second antenna 30a is disposed in the direction orthogonal to the travel direction of head car 10a. Fifth antenna 70b is disposed at coupling section 40b of following car 10b. For example, during communication via first antenna group 21, measurement unit 60 measures radio wave strength between second antenna 30a and the second antenna and radio wave strength between fifth antenna 70a and fifth antenna 70b. When radio wave strength between first antenna 20a and first antenna 20b is less than the predetermined value, an antenna group to be used for communication is switched to an antenna group to which antennas having higher radio wave strength belong, the antennas corresponding to either second antenna 30*a* and the second antenna or fifth antenna 70*a* and fifth antenna 70*b*. That is, the switch is made to either second antenna group 31 or fifth antenna group 71.

This configuration provides more options about antenna groups to be used for communication and causes, when cars 10 travel on, for example, a curved railway track, an antenna group to be used for communication to be switched to an antenna group having the highest radio wave strength, thereby further preventing the communication condition from deteriorating.

Other Exemplary Embodiments

The first to third exemplary embodiments have been described above as examples of the technique disclosed in the present application. However, the technique according to the present disclosure is not limited to the exemplary embodiments, and is also applicable to any exemplary embodiment achieved through appropriate changes, replacements, additions, omissions, or the like. The components described in the above-described exemplary embodiments may be combined to form a new exemplary embodiment.

Therefore, other exemplary embodiments will be described as examples below.

In the first exemplary embodiment, as shown in FIG. 2A and FIG. 2B, a description has been given of the configuration where first antenna 20 and second antenna 30 are provided adjacent to the ceiling of each car 10, but the technique is not limited to this configuration. For example, first antenna 20 and second antenna 30 may be provided adjacent to a floor of each car 10. Alternatively, a configuration where one of first antenna 20 and second antenna 30 is provided adjacent to the ceiling, and the other is provided adjacent to the floor may be employed. Alternatively, first antenna 20 and second antenna 30 may be provided near a center in a height direction of each car 10. That is, first antenna 20 and second antenna 30 may be provided at any positions in the height direction of each car 10 as long as first antenna 20 and second antenna 30 are provided at positions that are different from each other in the direction orthogonal to the travel direction of car 10 in top view. This configuration also applies to the second exemplary embodiment and the third exemplary embodiment.

Further, in the first exemplary embodiment, a description has been given of the example where, when first antenna group 21 is in use for communication, a switch is made from first antenna group 21 to second antenna group 31, but a switch may be made in the same manner from second antenna group 31 to first antenna group 21 when the second antenna group is in use for communication. Likewise, in the second exemplary embodiment, a switch may be made from the second antenna group and the fourth antenna group to the first antenna group and the third antenna group. Further, in the third exemplary embodiment, a switch may be made from the second antenna group to either the first antenna group or the fifth antenna group, or from the fifth antenna group to either the first antenna group or the second antenna group.

Further, in the first exemplary embodiment, a description has been given of the configuration where controller 50 determines whether radio wave strength, measured by measurement unit 60, between antennas belonging to one antenna group that have been used by controller 50 for communication is less than or equal to the predetermined value, but the technique is not limited to this configuration. For example, controller 50 need not make the determination, and measurement unit 60 may make the determination. Alternatively, for example, another component train communication system 1 includes may make the determination. Then, when radio wave strength, measured by measurement unit 60, between antennas belonging to the one antenna group that have been used by controller 50 for communication is less than or equal to the predetermined value, controller 50 switches an antenna group to be used for communication from the one antenna group to the other antenna group. Note that this configuration also applies to the second exemplary embodiment and the third exemplary embodiment.

Further, in the first exemplary embodiment, controller 50 determines whether radio wave strength measured by measurement unit 60 is less than or equal to the predetermined value, but controller 50 may determine whether the radio wave strength is less than the predetermined value. This configuration also applies to the second exemplary embodiment and the third exemplary embodiment.

Further, in the first exemplary embodiment, a description has been given of the configuration where first antenna group 21 and second antenna group 31 have different communication channels, but the technique is not limited to this configuration. For example, polarization of waves via first antenna group 21 and polarization of waves via second antenna group 31 may be different from each other. Likewise, in the second exemplary embodiment, first antenna group 21 to fourth antenna group 33 may have different communication channels. In the third exemplary embodiment, first antenna group 21, second antenna group 31, and fifth antenna group 71 may have different communication channels.

Further, in the first exemplary embodiment, a description has been given of the configuration where first antenna 20 and second antenna 30 are disposed on the one end side and the other end side, respectively, with respect to the center of each car 10 in the direction orthogonal to the travel direction of car 10 in top view, but the technique is not limited to this configuration. For example, first antenna 20 and second antenna 30 need not be disposed on the one end side and the other end side, respectively, with respect to the center unless the position where first antenna 20 is disposed and the position where second antenna 30 is disposed overlap each other in the direction orthogonal to the travel direction of car 10 in top view. This configuration also applies to the second exemplary embodiment and the third exemplary embodiment.

Further, in the first exemplary embodiment, the GPS is used to locate the position of each car 10, but the way of locating each car 10 is not limited to the GPS. For example, the position of each car 10 may be detected through communication performed by a detector called a balise aided detector. A balise aided system is capable of detecting whether car 10 travels on a curved railway track or a straight railway track. The balise aided system includes an interrogator and a ground transponder both located beside a railway track, and an on-vehicle transponder installed on car 10. When car 10 passes through between the interrogator and the ground transponder, the on-vehicle transponder thus installed transmits information to the ground transponder. This makes it possible to keep track of the current position of car 10. This configuration also applies to the second exemplary embodiment and the third exemplary embodiment.

Further, in the first exemplary embodiment, head car 10*a* has been given as a leading car, but the leading car is not limited to a head car and may be any car that precedes following car 10b. This configuration also applies to the second exemplary embodiment and the third exemplary embodiment.

Further, the present disclosure may be implemented in the form of not only a train communication system but also a method including steps (processes) to be executed by controller 50 and measurement unit 60 that are included in the train communication system.

For example, these steps may be executed by a computer (a computer system). The present disclosure may be implemented in the form of a program that causes a computer to execute the steps included in the method. Furthermore, the present disclosure may be implemented in the form of a non-transitory computer-readable recording medium such as a compact disc read-only memory (CD-ROM) in which the program is stored.

For example, in a case where the present disclosure is implemented in the form of a program (software), the program is executed with hardware resources of a computer such as a central processing unit (CPU), a memory, and an input and output circuit, so that each of the steps is executed. That is, the CPU fetches data from the memory or through the input and output circuit and performs an operation on the data, and then outputs a result of the operation to the memory or the input and output circuit, so that each of the steps is executed.

Further, controller 50 and measurement unit 60 included in each of the train communication systems according to the above-described exemplary embodiments may be implemented in the form of a large scale integration (LSI) corresponding to an integrated circuit (IC).

Further, the integrated circuit is not limited to an LSI and may be implemented by a dedicated circuit or a general-purpose processor. A field programmable gate array (FPGA) that is programmable or a reconfigurable processor in which connections between and settings of circuit cells in an LSI are reconfigurable may be used.

Further, if another circuit integration technique replacing the LSI appears as a result of advances in the semiconductor technology or due to another technology deriving from the semiconductor technology, such a technique may be applied to circuit integration of controller 50 and measurement unit 60 both included in each of the train communication systems.

As described above, the exemplary embodiments have been described as examples of the technique according to the present disclosure. The attached drawings and the detailed descriptions have been presented for this purpose.

Accordingly, the components described in the attached drawings and the detailed descriptions include not only components essential for solving the problem, but also components that are not essential for solving the problem. Thus, it should not be immediately deemed that, merely based on the fact that the components that are not essential are shown in the attached drawings and described in the detailed descriptions, the components that are not essential are essential.

Since the above described exemplary embodiments are intended to exemplify the technique according to the present disclosure, various modifications, replacements, additions, and omissions can be made within the scope of the appended claims or of their equivalents.

INDUSTRIAL APPLICABILITY

The present disclosure is applicable to a train in which communication is performed between cars. Specifically, the present disclosure is applicable to an electric train, a bullet train, a steam train, or the like.

REFERENCE MARKS IN THE DRAWINGS 1, 2, 3: train communication system
10, 100: car
10a: head car (leading car)
10b, 10c, 10d, 10e: following car
20, 20a, 20b, 20c, 20d, 200: first antenna
21: first antenna group
22, 22a, 22b, 22c, 22d: third antenna
23: third antenna group
30, 30a, 30b, 30c, 30d, 300: second antenna
31: second antenna group
32, 32a, 32b, 32c, 32d: fourth antenna
33: fourth antenna group
40, 40a, 40b, 40c, 40d: coupling section
50, 50a, 50b, 50c, 50d: controller
51a, 51b, 51c, 51d: controller
60: measurement unit
70, 70a, 70b, 70c, 70d: fifth antenna
71: fifth antenna group

The invention claimed is:

1. A train communication system that uses low power radio to perform communication between cars, the train communication system comprising:
   a first antenna group including a pair of first antennas arranged facing each other, one first antenna of the pair of first antennas being disposed at one end of a leading car, another first antenna of the pair of first antennas being disposed at one end of a first following car connected to the one end of the leading car;
   a second antenna group including a pair of second antennas arranged facing each other, one second antenna of the pair of second antennas being disposed at the one end of the leading car, a position where the one second antenna is disposed being different from a position where the one first antenna of the pair of first antennas is disposed in a direction orthogonal to a travel direction of the leading car in top view, another second antenna of the pair of second antennas being disposed at the one end of the first following car;
   a measurement unit configured to measure first radio wave strength between the pair of first antennas during communication via the first antenna group; and
   a controller enabled to switch an antenna group to be used for communication from the first antenna group to the second antenna group when the first radio wave strength is less than a first predetermined value, wherein
   the first antenna group further includes a pair of first following antennas arranged facing each other, one first following antenna of the pair of first following antennas being disposed at another end of the first following car, another first following antenna of the pair of first following antennas being disposed at one end of a second following car connected to the other end of the first following car, and
   the second antenna group further includes a pair of second following antennas arranged facing each other, one second following antenna of the pair of second following antennas being disposed at the other end of the first following car, a position where the one second following antenna is disposed being different from a position where the one first following antenna is disposed in a direction orthogonal to a travel direction of the first following car in top view, another second following antenna of the pair of second following antennas being disposed at the one end of the second following car.

2. The train communication system according to claim 1, wherein the one first antenna and the one second antenna disposed on the leading car are disposed on one end side and another end side, respectively, with respect to a center of the leading car in the direction orthogonal to the travel direction of the leading car.

3. The train communication system according to claim 1, wherein a communication channel of the first antenna group and a communication channel of the second antenna group are different from each other.

4. The train communication system according to claim 1, wherein to switch an antenna group to be used for communication from the first antenna group to the second antenna group, the controller makes both a switch from the pair of first antennas to the pair of second antennas and a switch from the pair of first following antennas to the pair of second following antennas at almost identical timing.

5. The train communication system according to claim 1, wherein to switch an antenna group to be used for communication from the first antenna group to the second antenna group, the controller first makes a switch from the pair of first antennas to the pair of second antennas and subsequently makes a switch from the pair of first following antennas to the pair of second following antennas.

6. The train communication system according to claim 5, wherein to switch the antenna group to be used for communication from the first antenna group to the second antenna group, the controller first makes a switch from the pair of first antennas to the pair of second antennas and subsequently makes a switch from the pair of first following antennas to the pair of second following antennas at timing corresponding to a speed of the leading car.

7. The train communication system according to claim 5, wherein to switch the antenna group to be used for communication from the first antenna group to the second antenna group, the controller first makes a switch from the pair of first antennas to the pair of second antennas and subsequently makes a switch from the pair of first following antennas to the pair of second following antennas at timing corresponding to a speed of the first following car.

8. The train communication system according to claim 1, wherein the controller
causes, when the first radio wave strength measured by the measurement unit is less than the first predetermined value, the measurement unit to measure a second radio wave strength between the pair of second antennas, and
makes, when the second radio wave strength is less than a second predetermined value, a switch of a communication modulation scheme of one antenna group to be used for communication of the first antenna group and the second antenna group.

9. A train communication system that uses low power radio to perform communication between cars, the train communication system comprising:
a first antenna group including a pair of first antennas arranged facing each other, one first antenna of the pair of first antennas being disposed at one end of a leading car, another first antenna of the pair of first antennas being disposed at one end of a first following car connected to the one end of the leading car;
a second antenna group including a pair of second antennas arranged facing each other, one second antenna of the pair of second antennas being disposed at the one end of the leading car, a position where the one second antenna is disposed being different from a position where the one first antenna of the pair of first antennas is disposed in a direction orthogonal to a travel direction of the leading car in top view, another second antenna of the pair of second antennas being disposed at the one end of the first following car;
a measurement unit configured to measure first radio wave strength between the pair of first antennas during communication via the first antenna group;
a controller enabled to switch an antenna group to be used for communication from the first antenna group to the second antenna group when the first radio wave strength is less than a first predetermined value;
a third antenna group including a pair of third antennas arranged facing each other, one third antenna of the pair of third antennas being disposed at the one end of the leading car, another third antenna of the pair of third antennas being disposed at the one and of the first following car, the third antenna group being enabled to communicate together with the first antenna group; and
a fourth antenna group including a pair of fourth antennas arranged facing each other, one fourth antenna of the pair of fourth antennas being disposed at the one end of the leading car, a position where the one fourth antenna is disposed being different from a position where the one third antenna is disposed in the direction orthogonal to the travel direction of the leading car, another fourth antenna of the pair of fourth antennas being disposed at the one and of the first following car, the fourth antenna group being enabled to communicate together with the second antenna group,
wherein the controller is enabled to switch the antenna group to be used for communication from the first antenna group and the third antenna group to the second antenna group and the fourth antenna group when the first radio wave strength is less than the first predetermined value during communication via the first antenna group and the third antenna group.

10. The train communication system according to claim 9, wherein the controller
causes, when the first radio wave strength measured by the measurement unit is less than the first predetermined value, the measurement unit to measure a second radio wave strength between the pair of second antennas, and
makes, when the second radio wave strength is less than a second predetermined value, a switch of a communication modulation scheme of one antenna group to be used for communication of the first antenna group and the second antenna group.

11. A train communication system that uses low power radio to perform communication between cars, the train communication system comprising:
a first antenna group including a pair of first antennas arranged facing each other, one first antenna of the pair of first antennas being disposed at one end of a leading car, another first antenna of the pair of first antennas being disposed at one end of a first following car connected to the one end of the leading car;
a second antenna group including a pair of second antennas arranged facing each other, one second antenna of the pair of second antennas being disposed at the one end of the leading car, a position where the one second antenna is disposed being different from a position where the one first antenna of the pair of first antennas is disposed in a direction orthogonal to a travel direction of the leading car in top view, another second antenna of the pair of second antennas being disposed at the one end of the first following car;

a measurement unit configured to measure first radio wave strength between the pair of first antennas during communication via the first antenna group;

a controller enabled to switch an antenna group to be used for communication from the first antenna group to the second antenna group when the first radio wave strength is less than a first predetermined value; and a fifth antenna group including a pair of fifth antennas arranged facing each other, one fifth antenna of the pair of fifth antennas being disposed at the one end of the leading car, a position where the one fifth antenna is disposed being different from the position where the one first antenna is disposed and the position where the one second antenna is disposed in the direction orthogonal to the travel direction of the leading car, another fifth antenna of the pair of fifth antennas being disposed at the one end of the first following car, wherein the measurement unit measures, during communication via the first antenna group, radio wave strength between the pair of second antennas and radio wave strength between the pair of fifth antennas, and when the first radio wave strength is less than the first predetermined value, the antenna group to be used for communication is switched to either one antenna group of the second antenna group and the fifth antenna group, the one antenna group having higher radio wave strength of the two pieces of radio wave strength.

12. The train communication system according to claim 11, wherein the controller causes, when the first radio wave strength measured by the measurement unit is less than the first predetermined value, the measurement unit to measure a second radio wave strength between the pair of second antennas, and makes, when the second radio wave strength is less than a second predetermined value, a switch of a communication modulation scheme of one antenna group to be used for communication of the first antenna group and the second antenna group.

* * * * *